United States Patent [19]

Ueda et al.

[11] Patent Number: 5,263,107
[45] Date of Patent: Nov. 16, 1993

[54] RECEPTIVE FIELD NEURAL NETWORK WITH SHIFT-INVARIANT PATTERN RECOGNITION

[75] Inventors: Toru Ueda, Nara, Japan; Fumio Togawa, Hillsboro, Oreg.

[73] Assignee: Sharp Kabushiki Kaisha, Osaka, Japan

[21] Appl. No.: 647,823

[22] Filed: Jan. 31, 1991

[51] Int. Cl.⁵ .............................. G06K 9/62
[52] U.S. Cl. ........................ 382/14; 382/15; 395/22
[58] Field of Search ............ 382/19, 15, 34; 395/21, 395/22, 23

[56] References Cited

U.S. PATENT DOCUMENTS

| | | | |
|---|---|---|---|
| 4,136,332 | 1/1979 | Kadota et al. | 382/45 |
| 4,760,604 | 7/1988 | Cooper et al. | 382/15 |
| 5,048,100 | 9/1991 | Kuperstein | 382/15 |
| 5,060,276 | 10/1991 | Morris et al. | 382/46 |
| 5,067,164 | 11/1991 | Denker et al. | 395/22 |

FOREIGN PATENT DOCUMENTS 2910854 2/1980 Fed. Rep. of Germany .
3711872 10/1987 Fed. Rep. of Germany .

OTHER PUBLICATIONS

Kohonen et al., *IEEE, Proc. of ICNN* vol. 1, pp. 1-61 to 1-68.
Rumelhart et al., Eds., *Parrallel Distributed Processing: Explorations in the Microstructure of Cognition* (1986) vol. 1, Chapter 8, pp. 318-362.
Waibel et al., *IEEE Trans. Acoustics, Speech, Signal Processing* (1989) vol. 37, No. 12, pp. 1888-1898.
Le Cun et al., *Neural Information Processing Systems 2* Touretzky, D., ed., Morgan Kaufmann Publishers, (1989) vol. 2, pp. 396-404.
IBM Technical Disclosure Bulletin, vol. 27, No. 6, Nov., 1984 pp. 3423-3424.

*Primary Examiner*—Leo H. Boudreau
*Assistant Examiner*—Christopher Kelley
*Attorney, Agent, or Firm*—Morrison & Foerster

[57] ABSTRACT

A neural network system and method of operating same wherein input data are initialized, then mapped onto a predetermined array for learning or recognition. The mapped information is divided into sub-input data or receptive fields, which are used for comparison of the input information with prelearned information having similar features, thereby allowing for correct classification of the input information. The receptive fields are shifted before the classification process, in order to generate a closest match between features which may be shifted at the time of input, and weights of the input information are updated based upon the closest-matching shifted position of the input information.

13 Claims, 23 Drawing Sheets

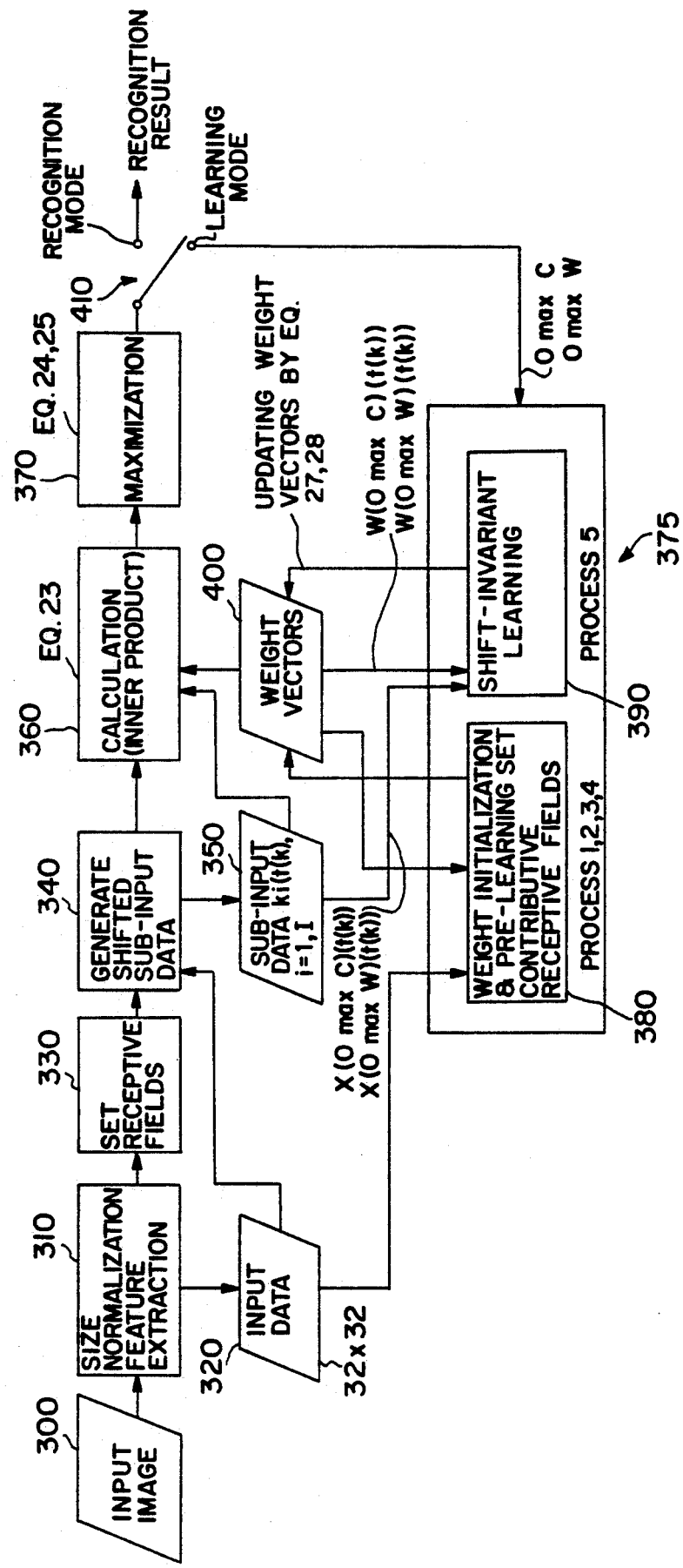
FIG. IC

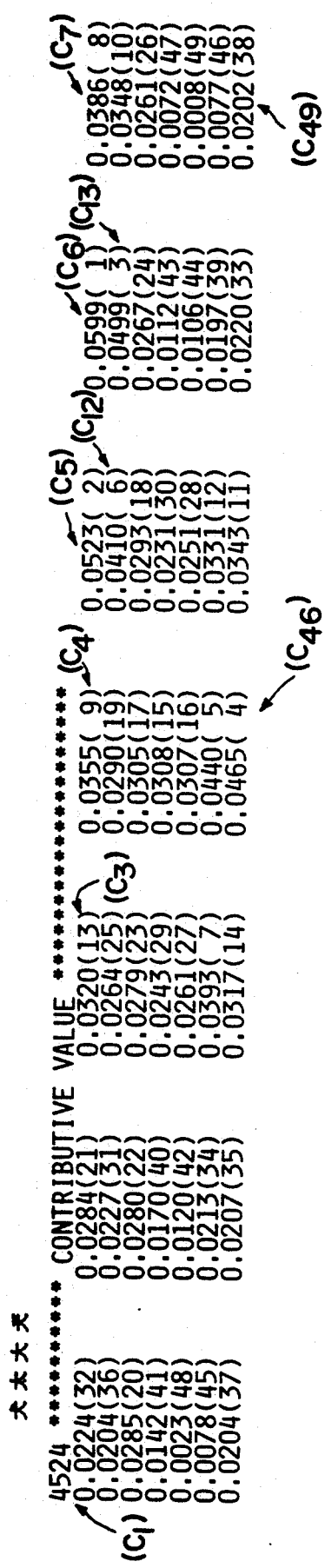
FIG.5
```
K=4
con_num[0]= 4    i.e. use C5
con_num[1]= 6    i.e. use C7
con_num[2]= 45   i.e. use C46
con_num[3]= 2    i.e. use C3
```
FIG.6
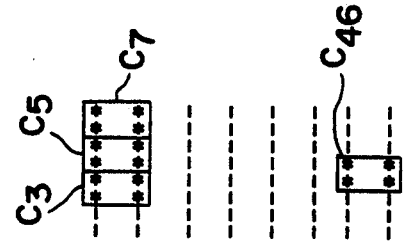
FIG.7

RECEPTIVE FIELD NEURAL NETWORK WITH SHIFT-INVARIANT PATTERN RECOGNITION

FIELD OF THE INVENTION

The present invention relates to a learning apparatus and method of an artificial neural network, which utilizes receptive fields and shift-invariance for pattern recognition.

BACKGROUND OF THE INVENTION

Recently, the so-called "neural network" model has been used to solve problems in speech recognition, character recognition and expert systems.

Conventionally, one teacher-supervised learning method of a neural network is carried out as follows. One piece of input data is fed into the network and the output value of each output node is calculated. After that, the learning algorithm determines the necessary changes to the weights, and the weights are updated. Some networks accumulate the value for weight changes, and update the weights after all data are fed into the network. Such methods are disclosed, for example, in the following background references: "Statistical Pattern Recognition with Neural Networks: Benchmarking Studies" by Kohonen, G. Barne and R. Chrisley in IEEE, Proc. of ICNN, Vol. I, pp. 61–68, July 1988 and "Learning Internal Representations by Error Propagation," Vol. I of "Parallel Distributed Processing: Explorations in the Microstructure of Cognition" (see especially chapter 8), MIT Press, Cambridge, Mass., 1986, by D. Rumelhart, G. E. Hinton, and R. J. Williams. Each of the foregoing references is incorporated herein by reference.

After the learning procedure, the neural network is able to recognize input data—that is, classify input data which is unknown or unlearned, but which is similar to the learned data, into a proper class, by correlating the unknown input patterns with prelearned patterns. Thus, a neural network constructed according to prior methods can provide a high recognition ability for unlearned data, if a sufficient variety of patterns of learning data are used for learning one class of data which is later to be recognized.

However, when an unlearned character or other datum to be recognized has a feature which is the same as a feature of the learned data, but the feature is located in a different position in the unlearned data, neural networks of prior methods do not provide highly accurate recognition ability. The method called "time-delay neural network" (TDNN) solves this in part, by learning the data in different positions. The method is disclosed in a report "Phoneme Recognition using Time-Delay Neural Networks" by A. Waibel, T. Hanazawa, G. Hinton, K. Shikano, and K. Lang in IEEE Trans. Acoust., Speech, Signal Processing, Vol. 37, pp. 1888–1898, Dec. 1989. (These articles are incorporated herein by reference.) Importantly, though, the Waibel (TDNN) method does not detect the actual locations of the feature in the learned data, and the weights are updated only by all the shifted data. Therefore, learning in the TDNN method is inefficient.

A method for solving a similar problem in set forth in "Handwriting Digit Recognition with a Back-Propagation Network" by Le Cun, et al. in *Neural Information Processing Systems*, Vol. 2, pages 396–404 (1989), which by way of background is incorporated herein by reference. The Le Cun architecture uses a five-layer network where the upper layers are used to detect the locations of local features.

Other problems can arise when an input character to be recognized is the same as a learned character, but in a different font, so that the various minute features of the input character are located differently from those of the learned character. In systems wherein entire characters are compared for recognition, the differing locations appear as noise.

SUMMARY OF THE INVENTION

The present invention has been developed with a view to substantially solving the above-described disadvantages, and has as an important object the provision of an improved neural network learning apparatus and method that can provide a high recognition ability even when features in unlearned data (i.e., the data to be recognized) are shifted relative to the locations of similar features in the learned data.

The apparatus and method of the invention can handle shifted or rotated data as follows. One input character or other datum to be learned or recognized is divided into some predetermined number of sub-input data which comprise portions of the input data. If a rotate-invariant neural network is needed, sub-input data are generated which represent a rotated portion(s) of the input data. Each sub-input datum is fed into the network, and the output values are calculated.

If the input datum is divided into N sub-input data and the network has M output nodes, M×N output values are calculated for one input vector. One or more nodes of M output nodes are assigned to each of a number of classes, the classes being defined to classify all of the learned data. In a preferred embodiment, the LVQ2 learning method is taken for updating weights. This LVQ2 method is discussed in the above-mentioned Kohonen article and in "Statistical Pattern Recognition Revisited" by T. Kohonen, *Advanced Neural Computers*, pp. 137–143 (1990). (*Advanced Neural Computers* is incorporated herein by reference.) Other learning methods (such as back-propagation) can be used in this method, but the LVQ2 learning algorithm will be discussed herein by way of example.

After the calculation of M×N output nodes, a first maximum value which is the largest of all of the output values which are in the same class as the input datum is selected. In addition, a second maximum value which is the largest of all the values which are not in the same class as the input datum is selected along with the first maximum value. The LVQ2 method updates only the two weights whose output nodes have these selected first and second maximum values, in the following manner: if the node whose output value is maximum is not in the correct class, and the node whose output value corresponds to the second maximum is in the correct class, the weights of these two nodes are updated.

The present network utilizes N sub-input data and M×N output node values. When the above first and second maximum values are selected, the sub-input datum which corresponds to the maximum output value is not always the same as the sub-input of the second maximum output value. In other words, the selection procedure chooses not only the maximum value, but also the sub-input datum which corresponds to the value.

Weight updating is carried out using such selected sub-input data. This means the network selects the appropriate node (weight) and the appropriate sub-input data in the same time and the weight is updated by that sub-input data, so that a correct class output value is made larger and a wrong class output value is made smaller.

If different input data have features which are similar, but the locations of these features are not the same, a conventional (e.g., TDNN) network has to remember all of these input data with their associated weights, because the output values in the network are sensitive to the locations of the features. The present invention solves this inefficiency by selecting the appropriate sub-input datum and updating the weight using that sub-input datum. In this way, one weight can represent the same feature in many different locations.

In test mode (i.e., pattern recognition mode), input data are also divided into N sub-input data. These N data are fed into the network, which then selects the node whose output value has a maximum value. The category to which the node belongs is selected as the pattern (e.g., letter, word, etc.) which is recognized.

In the above description, the LVQ2 method is used as an example of a learning method, but other methods can be used in the present invention. For instance, if back-propagation learning is used, all output values and error values are calculated. If the network has M output nodes and N input sub-inputs, the sub-input datum which gives the minimum output error out of N output errors (through summation of M output error values) is selected.

When a minimum error value is selected in this procedure, one sub-input datum which corresponds to the error value is determined. The error value and sub-input are used for the back-propagation learning method.

Another important feature of the present invention involves the use of receptive fields. When characters or other patterns are submitted to the neural network for recognition, the network classifies the input patterns into subcategories which bear similarities to one another. The system of the invention determines, for each subcategory of otherwise similar patterns, regions of those patterns by which they differ to the greatest extent. It is then these regions which are utilized to distinguish one pattern from another, and thereby to identify and recognize a given pattern.

The most powerful and preferred embodiment of the invention utilizes both these receptive fields and the shift-invariant method described above, where the receptive fields are first identified and isolated, and the shift-invariant method is applied to the receptive fields being compared in a particular subcategory.

BRIEF DESCRIPTION OF THE DRAWINGS

FIG. 1C is a high-level flow chart showing a preferred method of the invention.

FIG. 5 shows an array of contributive values derived from four sample Kanji characters.

FIG. 6 represents the contributive tiles of FIG. 5 having the four highest contributive values.

FIG. 7 shows the application of the contributive tiles of FIG. 6 to the 32×32 array of FIG. 4.

DESCRIPTION OF THE PREFERRED EMBODIMENTS

Figure 1:
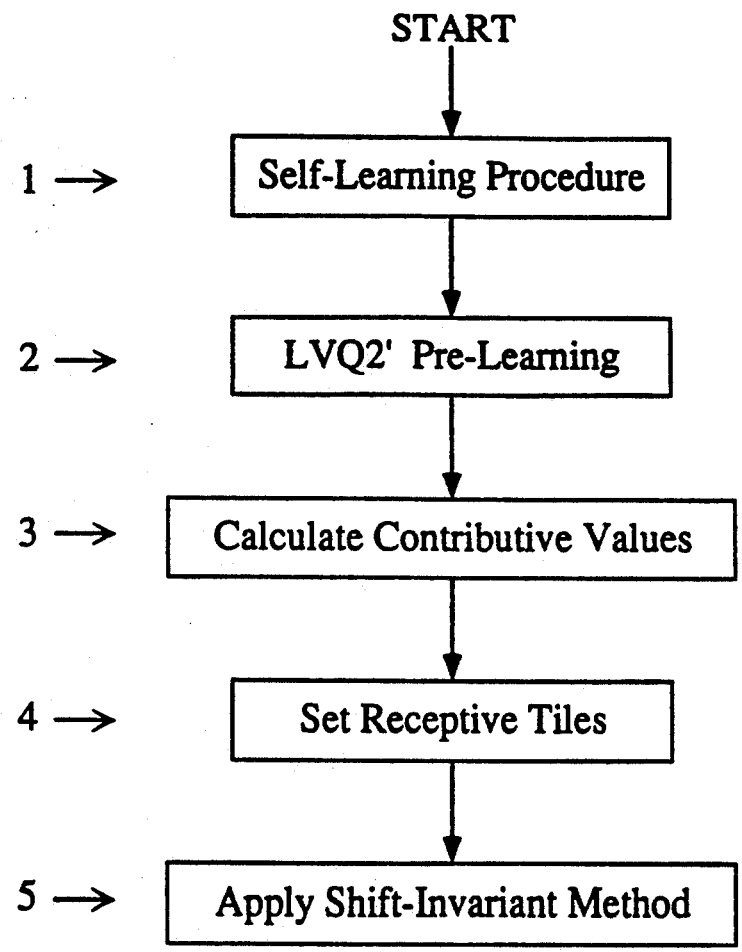
FIG. 1 shows an overall flow chart of the method of the invention.

The method of the invention is represented by the flow charts of FIG. 1 and, in somewhat greater detail, by the flow chart of FIG. 1C. In FIG. 1, five basic steps are depicted. Process 1 is the self-learning procedure, wherein weight vectors are initialized by self-organization learning within each class of characters or patterns. This is discussed in greater detail below.

In Process 2, the pre-learning procedure is carried out. This is a preliminary, supervised learning process which is a new, modified procedure, based in part on the LVQ2 method discussed above. The new method, referred to herein as LVQ2', is described in detail in the Japanese Patent Application Serial No. 1-60327 entitled "Neural Network Learning Apparatus and Method" filed on Mar. 13, 1989. That application was filed in the United States on Mar. 12, 1990, and is pending as Ser. No. 491,732, and is incorporated herein by reference. The LVQ2' procedure is discussed in greater detail below.

In Process 3 of FIG. 1, the method of the invention calculates contributive values of tiles representing subsets of a 32×32 array in which a given input character is represented.

In Process 4, the contributive tiles determined in Process 3 having the most significant values, as defined below, are selected as receptive tiles for distinguishing among different characters or patterns within a subcategory.

Finally, in Process 5, a shift-invariant LVQ2' method is applied to the receptive fields or tiles selected in Process 4, so as to finally identify the input character or pattern.

FIG. 1C shows the process flow and data flow of a preferred embodiment of the invention. In this figure, the arrows with heavy, dark arrowheads indicate process flow, and the arrows with sharp, light arrowheads indicate data connections or communications. FIG. 1C thus shows two possible modes: recognition and learning. If recognition is being carried out, the method proceeds along steps 300, 310, 330, 340, 360 and 370, with output of the recognition result at logical switch 410. If learning is being carried out, the method proceeds along steps 300, 310, 330, 340, 360 and 370, and then down to steps 380 and 390, which include Processes 1-5 and constitute the majority of the discussion in this application.

In either mode, an image is first input at step 300, and size normalization is carried out at step 310 in the manner described below in connection with Process 1. Then, the receptive fields for the data are set in box 330, in a manner as described below with respect to Process 4.

In step 340, the system generates shifted sub-input data as in Process 5 below, and for this purpose uses the input data 320 as mapped onto a 32×32 array. These sub-input data are stored as data 350, and are provided both for step 360 and for Process 5 (step 390).

In step 360, the inner product calculation (discussed in detail below) is carried out, using prelearned information weight vectors (data 400) and the sub-input data 350. This corresponds to Equation 23 set forth in Process 5 below.

Then, step 370 involves the maximization procedure of Equations 24 and 25, also set forth in Process 5 below. At this point, the maximum result yields a recognition result, if the system is in recognition mode, which is output at 410.

If the system is in learning mode, the procedure branches to box 375, which includes steps 380 and 390, which are discussed in detail in processes 1-5 below. Output from step 390 comprises updated weight vectors which appear as data 400.

Figure 1A:
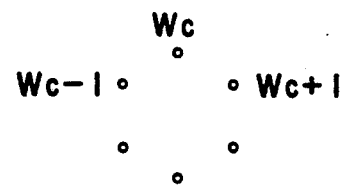
FIG. 1A is a map of weight vectors with linked neighbors.
Figure 1B:
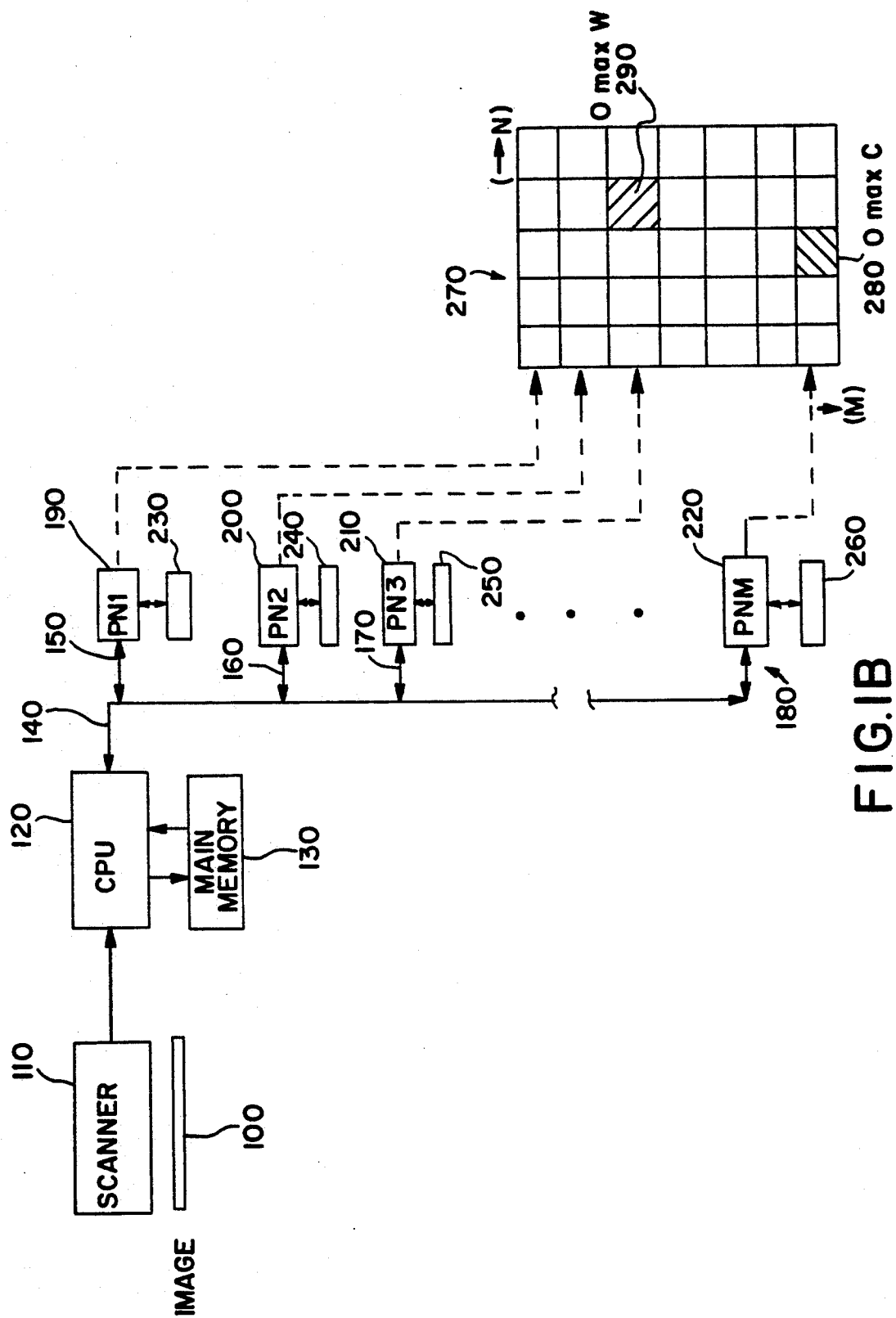
FIG. 1B is a block diagram of a system according to the invention.

FIG. 1B is a block diagram showing a physical embodiment of the invention. First, an image 100 (see FIG. 1B) is scanned in by a scanner 110 and input into a central processor unit (CPU) 120.

The neural network is substantially embodied in and controlled by the CPU 120, which utilizes a main memory 130 to which it is connected. Thus, each of the following Processes 1-5, as well as the recognition procedure, is fully carried out by the CPU 120 in conjunction with the processor nodes 190-220.

The CPU 120 is connected to a main bus 140 and buses 150, 160, 170 and 180, which are in turn connected to processor nodes 190, 200, 210 and 220, respectively.

There are M local processor nodes PN1-PNM (190-220, respectively), as discussed in further detail below. Each processor node is connected to a local memory, namely memories 230, 240, 250 and 260, respectively. These processor nodes generated M outputs for each of N classes of data, as indicated in the matrix 270. The operation of the processor nodes in the system of the invention is discussed in detail below.

The method of the invention is therefore physically embodied in the preferred configuration of FIG. 1B, which includes means for carrying out each of the necessary functions. It will be understood that many of these functions are carried out by means of program instructions stored in the main memory and utilize data stored both in that memory and the processor node memories, and hence are not separately shown in the drawings. It will be clear to practitioners in the art in the course of the following discussion when the means for carrying out the various functions are to be accomplished by program instructions.

PROCESS 1

Self-Learning Procedure

In the method of this invention, graphical or character data are input. (Alternatively, audio data or other types of data may be input. This application is directed to printed or written data for the sake of example only.) The characters are pre-segmented and their sizes are mapped or normalized to, for instance, a 32×32 pixel grayscale array (or matrix) or a 16×16 array. This is carried out by the CPU 120 in conjunction with the scanner 110 (see FIG. 1B). The mapped image is then used as an input to the neural network. Thus, for a 32×32 matrix, there will be 1024 inputs to the network.

The range of values of the inputs depends upon the amount by which the data has been effectively compressed. For instance, if a 64×64 character scan is reduced to a 16×16 matrix, this is a reduction of 16 (a factor of 4 in each dimension), such that each pixel in the 16×16 matrix has a value between 1 and 16. This may be referred to as a "gray value." The gray values are the inputs to the network.

Each input value is normalized by the following equation (where the $X_i$'s ($i=1, I$) represent the components of the entire set of input values):

$$X_i = X_i / \sqrt{(\Sigma X_i^2)} \tag{0}$$

$$i = 1, I$$

With this normalization, the sum (i.e. inner product) of all the normalized $X_i$ components is equal to one. That is, a norm (a length) of the vector is equal to 1. This way, every normalized input vector has the same length, i.e., has a length normalized to 1.

The output of the first layer is expressed as follows:

$$O_j = \Sigma(W_{ij}) \cdot (X_i)$$

where $W_{ij}$ is normalized as $$\frac{W_{ij}}{\sqrt{\Sigma_i (W_{ij})^2}}$$

and $X_i$ is normalized by dividing by $$\sqrt{\Sigma_i (X_i)^2} \ .$$

The norm of the vector $$|X|^2 = X \cdot X = \sum_i Xi^2 = 1,$$

by normalization.

Because of the normalization process, the lengths of the W and X vectors will be the same, and only the angle between them is of importance. Every time the vector is changed, it is renormalized.

The weight vectors for the normalized input values are then initialized in a self-organization learning procedure within each class of characters, which is a one-dimensional map with linked neighbors, as shown in FIG. 1A.

Figure 10:
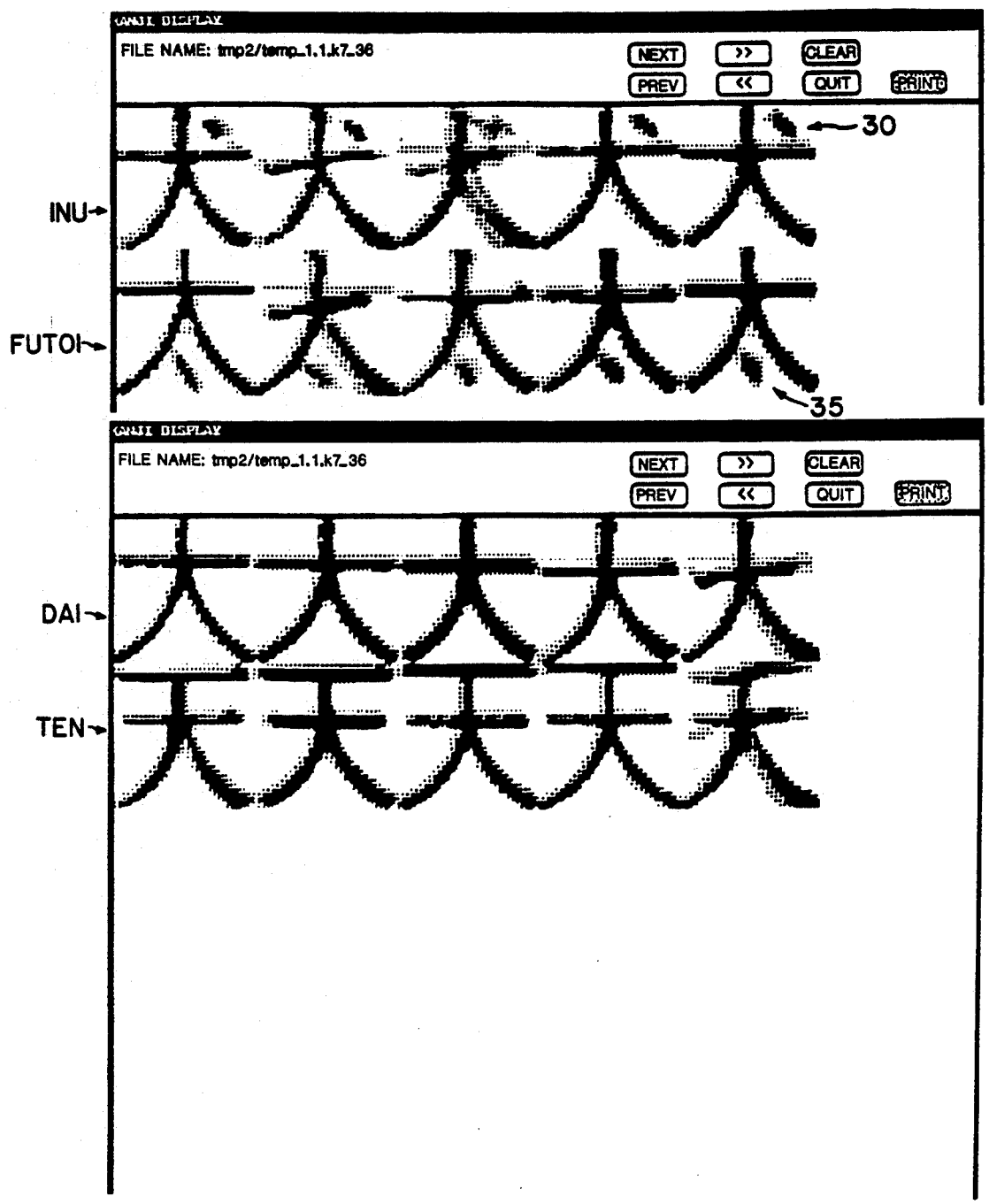
FIGS. 10–12 show screen snapshots of a computer implementation of the present invention, representing weights of characters and receptive fields.

Weight vectors grow to categorize input vectors by changing weight vectors with the largest activation output value strongly as in equation (6) below, and weight vectors of the neighbors are changed slightly according to equations (5) and (7) below. If a character has many possible types of fonts, weight vectors ultimately form composite, typical character styles (fonts). As shown in FIG. 10 in the present invention, typical fonts are preferably formed on five weight vectors in each character class; this figure shows weight vectors of 4 characters with 5 vectors each which were initialized by Process 1 in an actual implementation of the invention.

Weights are ordinarily initialized by small random values, but converge quickly in the LVQ2' process of preliminary learning as taught in the above-mentioned patent application.

Figure 3A:
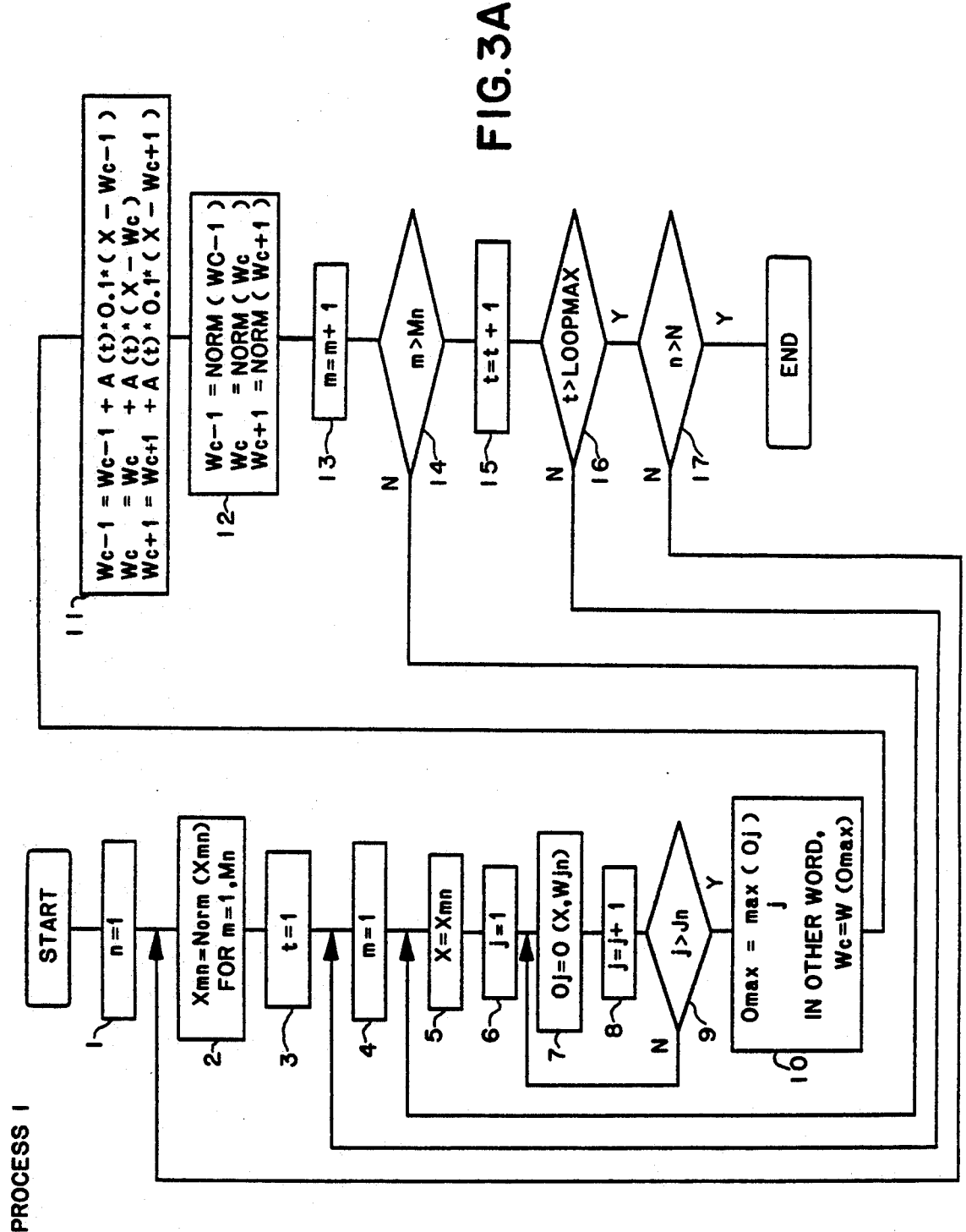
FIG. 3A is a flow chart of a method of the invention for self-organization of the input data.

FIG. 3A is a flow chart of the method of initialization preferably used in the present invention. That flow chart is also depicted in the following outline:

```
For n=1,N     ;Number n(n class) of classes
{
  Xmn=Norm(Xmn) for m=1,Mn    ;Normalization        (1)
  For t=1,T    ;Number t of learning iteration
  {
    For m=1,Mn  ;Number m of input vectors which
                 belong to class n
    {
      X=Xmn     ;Input vector X substitutes Xmn     (2)
                 of the input vector m which
                 belongs to class n
      For j=1,Jn ;Number J of weight vectors
                  which belong to class n
      {
        Oj=O(X,Wjn)                                 (3)
      }
      Omax=max{ Oj }                                (4)
           j
      Wc = W(Omax)
      Wc-1=Wc-1+ A(t)*0.1*(X-Wc-1)  ;Make next      (5)
                                     neighbor
                                     closer
      Wc = Wc+ A(t) *(X-Wc)          ;Make the      (6)
                                     closest
                                     weight
                                     closer
      Wc+1=Wc+1+A(t)*0.1*(X-Wc+1)   ;Make next      (7)
                                     neighbor
                                     closer
      Wc-1=Norm(Wc-1)                               (8)
      Wc= Norm(Wc)                                  (9)
      Wc+1=Norm(Wc+1)                              (10)
    }
  }
}
```

Defined as follows:

Xmn: Input vector m which belongs to class n

Wjn: Weight vector j which belongs to class n

W(Omax): Weight vector which gives the largest output Omax in class n

Wc: W(Omax)

Wc−1: Next neighbor (−1) weight vector to W(Omax)

Wc+1: Next neighbor (+1) weight vector to W(Omax)

Norm(X): A function that normalizes a vector X into uniform vector (which "norm" is equal to 1), is defined as follows, each component:

Norm(X):  A function that normalizes a vector $X$ into uniform vector (which "norm" is equal to 1), is defined as follows, each component:

$$Xi = Xi / \sqrt{\sum_{i=1,I} (xi \times xi)} \quad (11)$$

$O(X, W)$: An inner product betwen an input vector $X$ and a weight vector $W$ is defined as $$O(X, W) = \sum_{i=1,I} (xi \ast wi) \quad (12)$$

$A(t)$: A decrease function of loop $t$ with a range of $\quad (13)$
 $0 < A(t) < 1$, for instance, defined as $A(t) = C \ast (1 - t/T)$, where $C$ is a constant value such as $C = 0 \cdot 1$.

Other initialization and preliminary learning procedures may be utilized, and the present invention is not restricted to the above example. For example, in conventional neural network systems, random weight initialization may be used. Random weight initialization may also be used in the present application, but is not as fast as the above self-organized weight initialization procedure.

PROCESS 2

LVQ2' Pre-Learning

In the LVQ2' supervised learning method of Process 2, weight vectors are changed to make the weight vector with the largest output closer to input vector which belongs to the same class as the input character, in equation (20) below. At the same time, it makes the weight vector with the largest output far away from the input vector which belongs to other classes than the same class as the input character, in equation (19) below.

Figure 2:
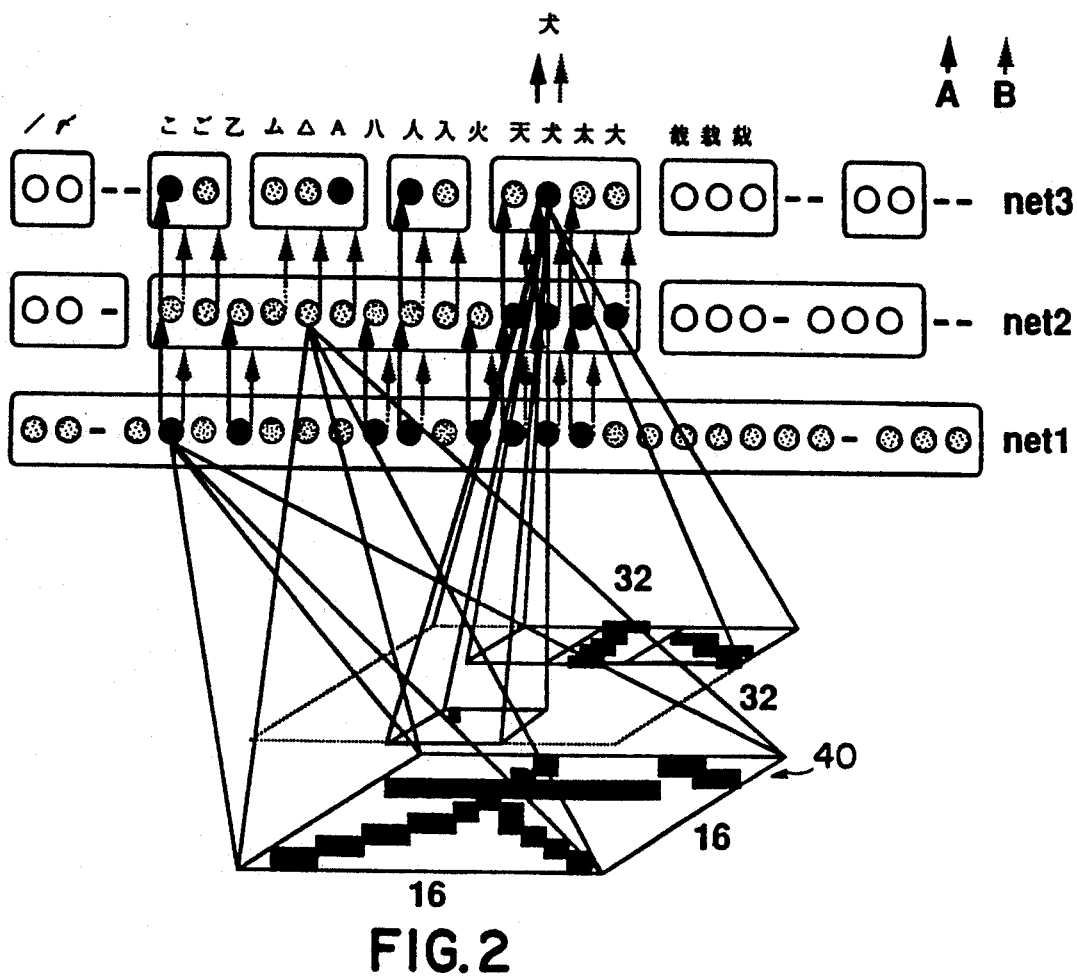
FIG. 2 shows a network for subcategorizing input data in the invention.

FIG. 2 shows the overall process and structure according to the LVQ2' method, which is carried out under the control of the CPU 120 and processor nodes 190–220 shown in FIG. 1B. The image or other pattern is input into the first layer of the network "net1" (see FIG. 2), which categorizes the image into one of several different groups or categories. The categorized pattern is then output to net2, which, by way of example, shows three subcategories of characters. In similar fashion, these categories are then used as inputs to net3, which subcategorizes each character into one of many different subcategories.

In FIG. 2, the "A" and "B" arrows differ in that the A arrows represent network pathways wherein only one (or zero) nodes on an upper level may be activated by a given node from a lower level. However, as seen for arrows B, one node using the "B" method (shaded)

may activate many nodes on a higher level. The "B" method may lead to more accurate results, because a character which is correct may be improperly omitted at the net1 level, using the "A" method; while in the "B" method there is another chance to recover that character as the properly recognized character. The "A" method, on the other hand, may be more efficient at generating pattern recognitions.

The second subcategory from the right in the net3 layer of FIG. 2 includes the characters Inu, Futoi, Dai and Ten. It is the output from net3 which is used as the input for the method of the present invention (which itself is preferably a single-layer network).

The LVQ2' learning process has two phases: Phase #1 and Phase #2. In Phase #1, the above weight changing is done by equations (19) and (20) under the condition that OmaxC (the largest output value within the class "correct class") is ranked as the second overall largest output or the nth (n>2) one, and OmaxW (the largest output value out of the class "wrong classes") is ranked as the first overall largest output, so that the overall largest output can come from weight vectors within the correct class. Since this is supervised learning, the computer knows which class is correct.

In Phase #2, the above weight changing is done by equations (20) and (19) under the condition that a ratio of OmaxW to OmaxC>RATIO, so that the overall largest output value of the correct class can be kept further away from the overall second largest output value of wrong classes.

Figure 3B:
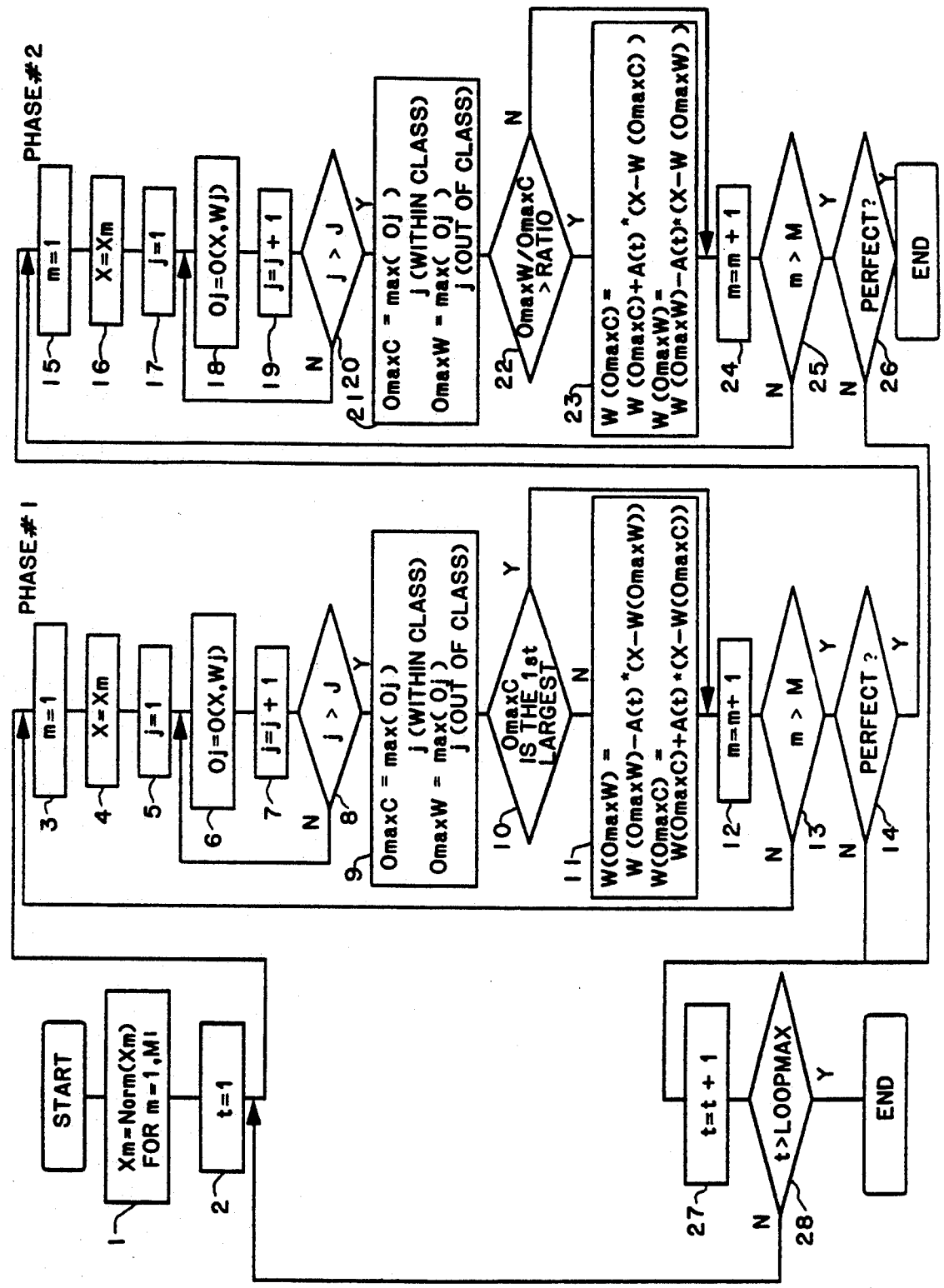
FIG. 3B is a flow chart of a method for preliminary learning for the input data.

This learning method enables effective learning of weights vectors, and appears in the flow chart of FIG. 3B. It is also depicted in the following outline:

```
Xm=Norm(Xm) for m=1,M   ;Normalization            (14)
For t=1,T   ;Number t of learning iteration
{
    [Phase #1]
    {
        For m=1,M   ;Number m of input vectors
        {
            X=Xm        ;Input vector X substitutes Xm of
                         input vector m which is assumed to
                         belong to class n                 (15)
            For j=1,J   ;Number j of weight vectors
            {
                Oj=O(X,Wj)                                  (16)
            }
            OmaxC=max{ Oj }                                 (17)
                   j within class n
            OmaxW=max{ Oj }                                 (18)
                   j out of class n
            If OmaxC is ranked at the 2nd overall
            largest output or the nth (n>2) one and
            OmaxW is ranked at the first overall
            largest output,
            {
                W(OmaxW)=W(OmaxW)−
                A(t)*(X −
                W(OmaxW)); to make W(OmaxW)
                far from
                X                                           (19)
                W(OmaxC)=W(OmaxC)+
                A(t)*(X −
                W(OmaxC)); to make W(OmaxC)
                closer to
                X                                           (20)
            }
        }
    }
    If all input vectors pass through Phase #2 without any
    change of weight vectors W, stop. If not, go to Phase
    #1 again.
}
```

Defined as follows:
Xm: Input vector m
Wj: Weight vector j
W(OmaxC): The weight vector given with the largest output OmaxC which belongs to the same class (correct class) as the input vector X.
W(OmaxW): The weight vector given with the largest output OmaxW which belongs to other classes (wrong classes) than the same class as the input vector X.
RATIO: A constant value; for instance RATIO=0.50.

Like Process 1, Process 2 is an example of a learning method which is preferably utilized in conjunction with the present invention. However, other methods may likewise be used. The above method is fully described in the above-mentioned patent application, Ser. No. 491,732.

An example of the application of Process 2 is as follows. In short, this step insures that, in the supervised preliminary learning, the value of RATIO which is returned is less than 0.5 (or some other predetermined value) by the end of the procedure.

In one example, three variations (e.g., light, normal and bold) of each of two different characters (such as R and H) are input. These form the learning database. Each of the characters in the database is then subjected to the method of the present invention, and the computer generates an output indicating which character was recognized in each case. Sometimes, in the initial passes, the character which is recognized is not the same as the character which is input. The computer can determine this because it already has the information about the input characters (which came from the established database). The method is reiterated sufficient times to generate 100% accurate recognition output (or another predetermined threshold), with a maximum of twenty iterations. Thus, for 600 inputs (in this example: 2 letters with 3 variations apiece and 100 fonts per letter), there will be two outputs resulting from the recognition process, with each output being one of the two letters. For each correct answer, the weight vector is adjusted according to the LVQ2' method.

The reiteration of the method when stopped when the value of the ratio $R_i$ reaches 0.5. $R_i$ is the ratio of the weight given to the "R" determination to the weight given to the "H" determination. For instance, if the "R" value is 0.47, and the "H" value is 0.91, then the ratio $R_i$ equals 0.47/0.91, or approximately 0.52. In this case, the computer reiterates the method. When $R_i$ drops below 0.5, the method is stopped. Otherwise, the method is stopped after a maximum of 20 iterations. Note that, whenever the H value (here, 0.91) is higher than the R value (here, 0.47), then the computer determines that "H" is the proper output. Even so, the computer reiterates the method until the ratio $R_i$ drops below 0.5.

The foregoing learning method is used, by way of example, utilizing four Kanji characters: Inu (meaning "dog"); Futoi (meaning "bold"); Dai (meaning "big"); and "Ten" (meaning "heaven"). These four characters appear from top to bottom, respectively, in FIG. 10, and also appear (from left to right) in FIG. 8A.

Each of the characters—Inu, Futoi, Dai and Ten— has five different weight vectors, for a total of 20 weight vectors. See FIG. 10. However, there are, of course, only four outputs for recognition purposes (one for each character).

The input image area preferably comprises a 32 ×32 array. Thus, there are 1,024 inputs, namely one input for each square in the 32×32 array. Each square has a value between 1 and 4, because the 32×32 array was reduced from a 64×64 array. There are 20 possible outputs. In one embodiment, there are 240 possible input characters: 4 characters×60 variations of each character.

Figure 11:
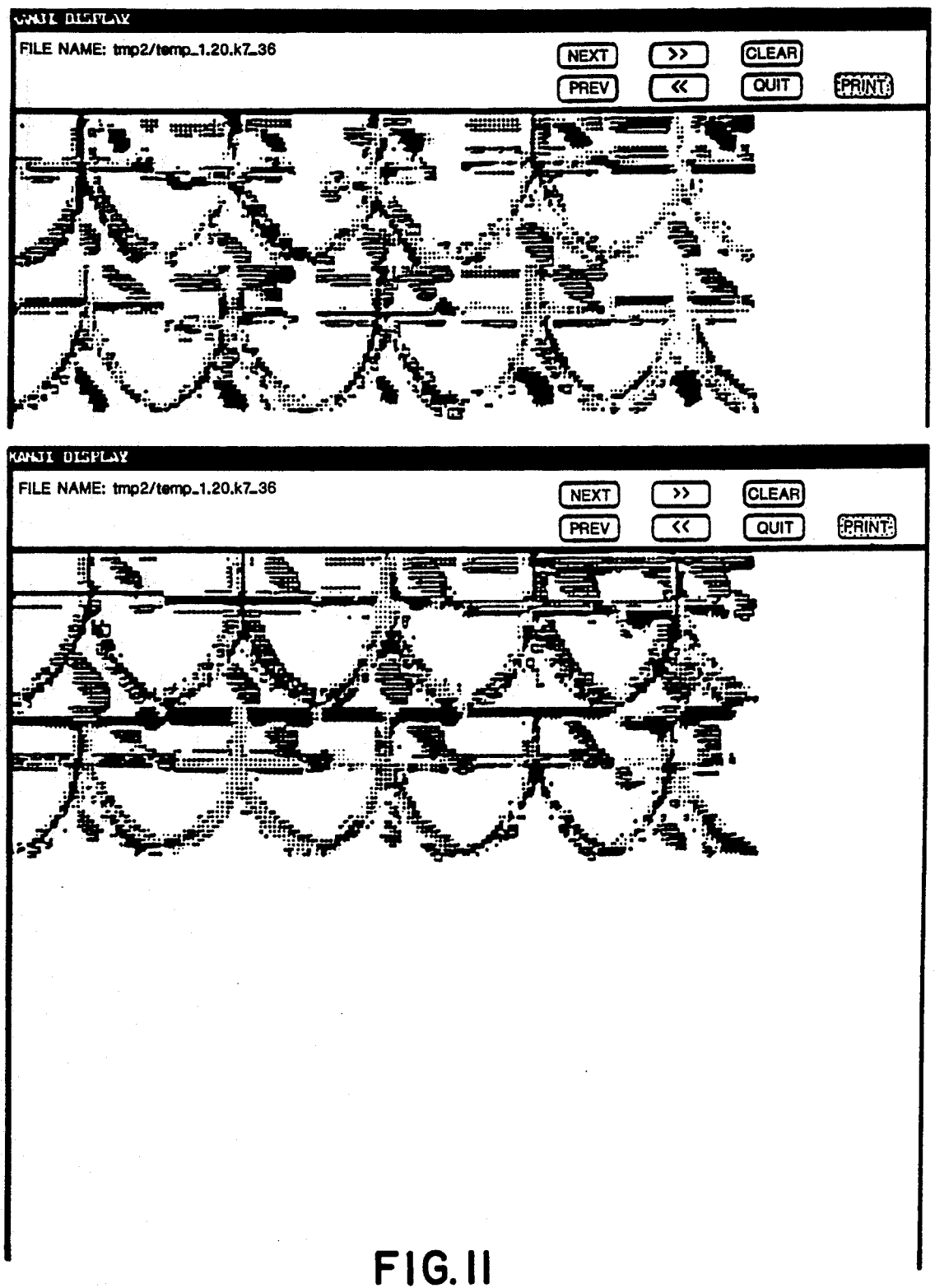

An output value is generated for each of the 20 weight vectors (five weight vectors for each of four characters). For instance, the Inu output values may be 0.4, 0.5, 0.6, 0.95 and 0.5, respectively. Similarly, the Futoi output values may be 0.7, 0.8, 0.7, 0.6 and 0.75, respectively. Similar weights may result for the other ten weight vectors (two other characters, five weight vectors for each). Since the 0.95 output value for the fourth Inu weight vector is greater than the output value for any of the other weight vectors, this will be selected by the method of the invention during recognition mode, and the correct result "Inu" will be generated. Note that this will occur, even though some of the "Inu" output values are less than some of the "Futoi" output values. Thus, by being presented with more initial choices, the computer is more likely to choose the correct answer in attempting to recognize a character. The result of this learning procedure is shown in FIG. 11.

PROCESS 3

Calculate Contributive Values

The method of the invention calculates contributive values Cm (where m=1 to M, M being the number of tiles) by correlation among weights. Contributive values reflect the regions in a given character which differ in a high degree from similar regions in other characters. When a character is input to the neural network for recognition, it is grouped in a category of characters. There are further subcategories of the characters, with the different Kanji characters for various exemplary subcategories appearing at the tops of FIGS. 8A-8K. See also FIG. 2.

Figure 8A:
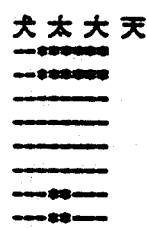
FIG. 8 shows the application of contributive tiles to numerous subcategories of Kanji characters, including FIGS. 8A–8K, etc.

The subcategory represented in FIG. 8A includes the four characters Inu, Futoi, Dai and Ten. The following discussion on contributive values, receptive fields (Process 4) and shift invariance (Process 5) is applicable to all of the subcategories (or any other categories of input data patterns), but is discussed in greatest detail with respect to this subcategory.

Thus, in this embodiment, the contributive values generated by the system will emphasize the regions in the characters Inu, Futoi Dai and Ten where they differ most from one another. From a visual inspection of these characters, it will be seen that the Inu (the leftmost character in FIG. 8A and the top character in FIG. 10) has a dot or "ten" 30 at its upper right, and the Futoi has a "ten" 35 in the bottom center. ("Ten" in this case is the Japanese term for the dot 30, and is not the same as the character shown in FIG. 10, which means "heaven".) The Dai has no such mark, and the Ten has a bar (called a "chok sen" in Japanese) across the top.

Therefore, from this inspection and according to the above description of contributive values, one would expect the highest contributive values for this subcategory of characters to relate to the top right, the center bottom, and in general across the top regions of the characters, since it is in these areas that the differences among these four characters appear. The remaining regions of the characters (two curved down strokes and a central bar) are quite similar. The visual inspection, as will be seen, is borne out by the actual operation of the system of the invention, as discussed below.

Figure 4:
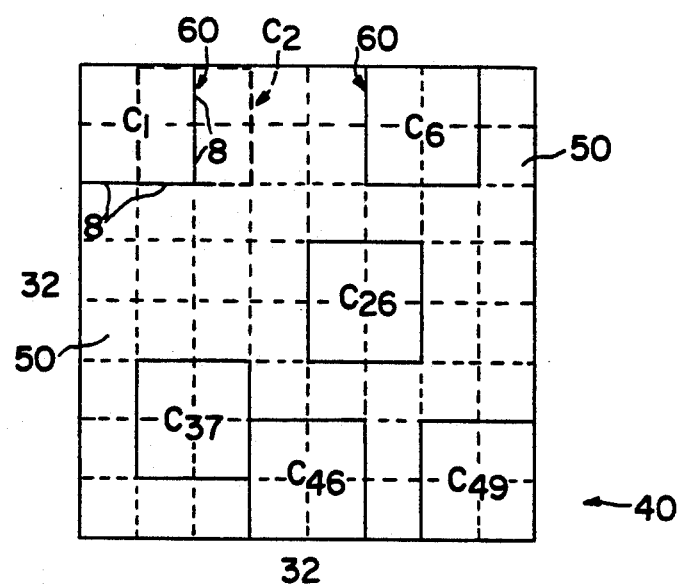
FIG. 4 depicts an example result of applying the method of FIG. 3 to a 32×32 pixel input image area.

The contributive value calculation is carried out according to equation (32) below, and as shown in FIG. 4, where each size of tile is 8×8, such that a numerical matrix or array such as the following is formed:

TABLE 1

| C1 | C2 | C3 | C4 | C5 | C6 | C7 |
|---|---|---|---|---|---|---|
| C8 | C9 | C10 | C11 | C12 | C13 | C14 |
| C15 | . | . | . | | | |
| | | | Cm | . | . | . |
| | | | . | | C41 | C42 |
| C43 | C44 | C45 | C46 | C47 | C48 | C49 |

The calculation of the contributive values Cm is carried out as follows:

$$Cm = \sum_{\substack{(j \neq k) \\ j=1,N \\ k=1,N}} \sum_{i=1,R} |Wji - Wki| \quad (32)$$

$$m = 1, M$$

In this case, M=7*7=49 tiles.

Figure 18:
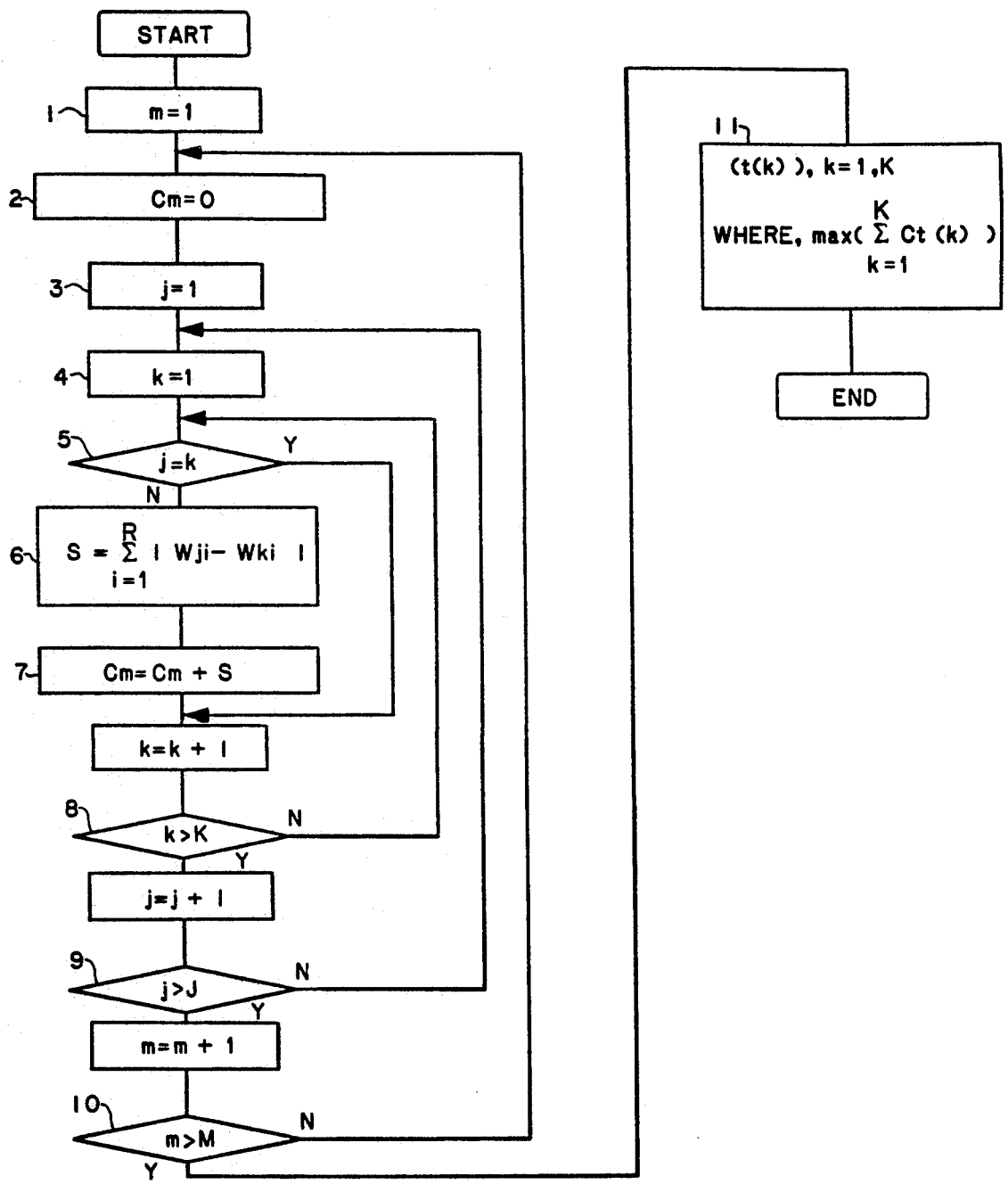
FIG. 18 is a flow chart showing the method of calculating contributive values.

FIG. 18 is a flow chart of the method of calculating the contributive values Cm, which basically implements Equation (32) and provides the value of Cm to box 11, which begins the receptive field determination (based upon the maximum contributive tiles), discussed in detail in Process 4 below.

FIG. 5 shows a sample of contributive values generated by a computer implementation of the invention. These values were calculated from the weight vectors for the recognition of the four characters Inu, Futoi, Dai and Ten, where:

N=4; Number of classes to be recognized
R=8*8=64; Size of each title
M=7*7=49; Number of possible titles As mentioned above, the input image area 40 of 32×32 pixels is divided up into squares 50 of 4×4 pixels each. See FIG. 4 (the pixels not being individually shown). The method initially defines 49 contributive tiles 60, each tile including four of the squares 50. Thus, the first tile (C1 in FIG. 4) is an 8×8 pixel tile in the top left corner of the input image area 40. The second tile (C2) is displaced to the right by one square, and thus includes the next four squares, two adjacent the top of the input image and two immediately below, in the second row. The left two squares in the second tile C2 overlap with the right two squares of the first tile C1. There are therefore seven tiles across the input image area, and seven rows of tiles from top to bottom, for a total of 49 contributive tiles C1-C49. (Many other variations may be used, such as 12×12 receptive field areas within 16×16 data areas, for a total of 25 contributive tiles.)

In Equation 32 above, the method is carried out as follows. First, for a given tile (for example, tile C1), the method sums the difference between the weight vector for each pixel in that tile for each pair of characters. Thus, $W_1-W_2$ is generated, and also $W_1-W_3$, $W_1-W_4$, and $W_2-W_3$. This covers all of the variations, since the right-hand expression in Equation 32 is an absolute value, and therefore $W_2-W_3$ generates the same result as $W_3-W_2$. Note that this is done for each of the 64 pixels (i.e., i=1 through 64) in the tile.

Accordingly, the sum of all the differences of $W_j-W_k$ is generated, where j and k each go from 1 to 4, and j does not equal k. Note that N=4 corresponds to the number of classes (here, the number of characters) to be recognized.

The above procedure is repeated for each of the 49 tiles, such that a value $C_m$ (m=1 to 49) will be generated for each tile. The contributive value $C_1$ reflects the overall range of values represented in the first tile among the four characters. In general, if there is a feature that appears in one character but not in the other characters, the tile or tiles containing that feature will generate a relatively large contributive value. As mentioned above, this would mean that the dot or "ten" 30 dot at the upper right of the character Inu shown in FIG. 10 leads to a high contributive value for tiles containing that region. This is because the characters Futoi, Dai and Ten do not have the "ten" (dot) at their upper right corners. This is reflected in FIG. 5, where the values $(C_5)$ and $(C_6)$ obtained for tiles $C_5$ and $C_6$ are quite high relative to the other values generated in the matrix of contributive values. Indeed, as shown by the ranking numbers in parentheses (to the right of the C-values), these are the two highest contributive values generated.

PROCESS 4

Determine the Receptive Fields (Set Receptive Tiles)

Once all the contributive values are generated, receptive fields are generated which represent the regions of greatest difference in a given subcategory of characters. In order to do this, the matrix of 49 contributive values shown in FIG. 5 is inspected for the highest contributive values. Then the method of the invention selects a group of contributive values which, in the aggregate, contribute most to the distinctions among the characters.

The receptive fields constitute subsets or subarrays of the input information as mapped onto the predetermined array, which are isolated for purposes of comparison with previously learned weights from a stored database of information. These subarrays are generated from predetermined patterns. As discussed in detail below, the contributive values are utilized to determine which ones of these subsets reflect to the greatest degree, i.e. best matches, previously learned weights. Based upon the optimal or best-match shift for the input information, a weight is then updated to that information.

The initial subcategorization described above relative to FIG. 2 is very efficient to use with the receptive field process, because the set of characters being considered in attempting to match an input character are already closely similar because of the subcategorization process resulting from net3.

The selection process of the preferred embodiment selects four such groups of the contributive values, with four contributive values to a group. This leads to the selection of four contributive tiles, determined by the sixteen contributive values selected.

The groups of most contributive tiles are selected as follows. All combinations of four contributive values $C_m$ are added up. Then, all of the four-value sums are compared, and the highest sum is chosen. An additional requirement in the preferred embodiment is that the tiles are selected so that they do not overlap. Given this condition, then the highest sum is chosen to determine the four most contributive tiles.

In practice, this works as follows. The sum of the contributive values $(C_1)$, $(C_2)$, $(C_3)$ and $(C_4)$ is generated. Then $(C_1)$, $(C_2)$, $(C_3)$ and $(C_5)$ are added. This continues, until, finally, the sum of $(C_{46})$, $(C_{47})$, $(C_{48})$ and $(C_{49})$ is generated. This generates 49C4=211,876 sums, and the highest of these sums is selected. If this leads to overlap, then tiles must be selected which maximize the total sum, but does not allow overlap.

Step 11 in FIG. 18 shows the method for determining the receptive fields and is the same as Equation 33 below. In step 11, the most contributive K tiles are found. The maximum summation value of $Ct(k)$ (k=1,K) is determined out of every possible M titles as shown in Equation (33) and step 11, where $t(k)$ (k=1,K) represents the different groups of contributive values. In the present invention, K is set equal to 4, and in general it is set to a number which adequately discriminates among the input data.

The most contributive K nonoverlapping tiles are selected which combination has the biggest (maximum) value on summation of contributive values of K tiles among those of every combination (M Combination K, for instance 5C2=10 combinations) as follows:

$$\{t(k)\}, k = 1, K \qquad (33)$$

$$\text{where maximum} \left( \underset{k=1,K}{\text{SUM}} Ct(k) \right)$$

Figure 9A:
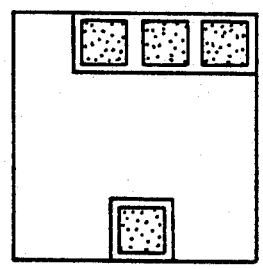
FIGS. 9A–9D show receptive fields for four subcategories of Kanji characters.
Figure 9B:
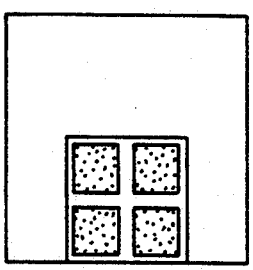
Figure 9C:
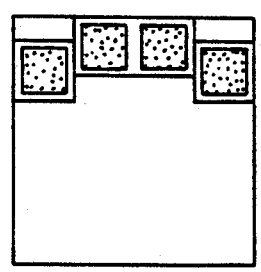
Figure 9D:
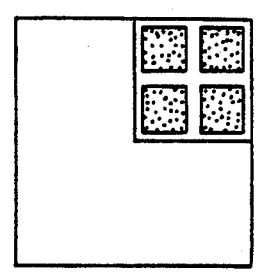
Figure 21:
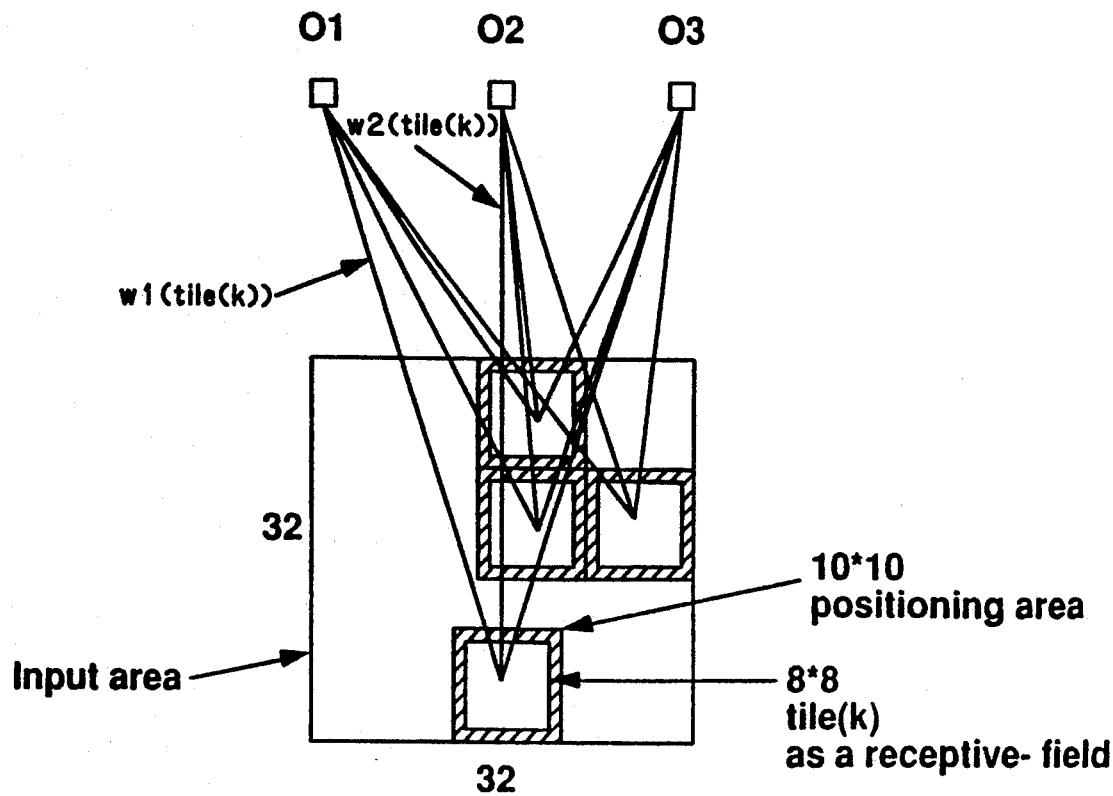
FIG. 21 depicts a shift-invariant receptive fields network of the invention.

A preferred embodiment of the structure of the neural network utilizing shift-invariant receptive fields is as shown in FIG. 21. FIG. 9 shows several examples in four sets of characters resulting from the use of four receptive fields (tiles). FIG. 9A corresponds to FIG. 8A, and FIG. 9C corresponds to FIG. 8E.

(Since each tile is 8×8 pixels, each tile therefore has 8×8=64 weights. Thus, although in FIG. 21, w1 for tile k is indicated by a single line, this single line actually represents 64 weights running from O1 to each of the four receptive field tiles. The millions of calculations carried out by this method can be efficiently accomplished by the "N6400" neural network chip available from Adaptive Solutions, Inc. (ASI) of Beaverton, Oreg. The ASI chip is programmable, and can quickly carry out the neural network calculations according to the invention. However, other electronic implementations may be used.

Using the foregoing method on the contributive values shown in FIG. 5, the first choice for a highly contributive tile would be tile $C_6$, since this includes the highest contributive value. However, the overall sum of four selected tiles is, as it turns out for this example, maximized by selecting contributive tiles $C_5$ and $C_7$, which (in conjunction with the other two choices) leads to a maximum value for the sum of the contributive values. Therefore, tile $C_6$ is foregone in preference to tiles $C_5$ and $C_7$.

In the foregoing manner, tiles $C_3$, $C_5$, $C_7$ and $C_{46}$, shown in FIG. 7, were selected. These tiles are representative of four regions in which the characters Inu, Futoi, Dai and Ten are quite dissimilar. FIG. 7 thus shows that the method of the invention does select tiles which relate to regions of input characters where those characters differ most from one another. That is, as expected, it is the top, top right, and bottom center regions which have the highest contributive tile values for the set of characters Inu, Futoi, Dai and Ten.

After the contributive values are calculated, the selected, non-overlapping tiles are superimposed upon the input image area shown in FIG. 4. Since each contributive tile is 8 pixels by 8 pixels, a total of 256 (=64×4) pixels are covered by the four contributive tiles.

From the above method, it will be seen that the diagram of FIG. 7, which is an 8×8 array of dashes and asterisks, corresponds to FIG. 4, where each dash or asterisk in FIG. 7 corresponds to one of the 64 squares of FIG. 4. That is, whereas each of the 64 squares in FIG. 4 corresponds to a 4×4 portion of the 32×32 array, each of the dashes or asterisks represents one of the 64 squares. The asterisks represent squares which form parts of the tiles which are selected as described above, in this example tiles C3, C5, C7 and C46; and the dashes represent the nonselected tiles.

Figure 8F:
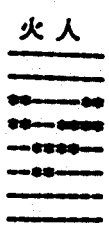
Figure 8B:
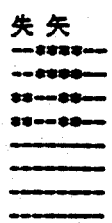
Figure 8G:
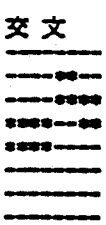
Figure 8C:
Figure 8H:
Figure 8D:
Figure 8I:
Figure 8E:
Figure 8J:
Figure 8K:
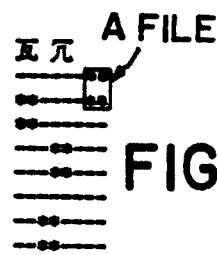

Schematic representations of such superimpositions for a variety of groups of characters are shown in FIG. 8, which includes FIGS. 8A–8K. In each of these figures, the selected tiles (represented by asterisks) agree with a visual inspection of the regions in which the input characters (appearing at the top of each figure) differ greatly from one another. For example, the two characters in FIGS. 8C are virtually identical, but for the feature in the top center, slightly to the left; and the selected contributive tiles reflect this. Similarly, the two characters which were input in FIG. 8F are similar except for the features on the left and right sides, and the selected contributive tiles reflect this fact.

Each of FIGS. 8A–8K represents one subcategory of characters which has been previously sorted according to the multilayered network shown in FIG. 2. Thus, the neural network of the present invention is preferably a single-layer network whose input is characters which have already been subcategorized.

In looking at FIGS. 8A–8K, it can be seen that the contributive tiles selected according to the method of the present invention in each case stress the regions of the Kanji characters which differ the most from one another within each group. By causing a computer which implements this method to inspect only these areas, processing time for character recognition can be considerably reduced, while accuracy is maintained. These contributive tiles form the "receptive fields" of the invention. Prior art neural networks utilize the entire input field to distinguish among characters or letters.

In general, it is preferable to ensure that the size of the receptive field which is selected is equal to or a little bigger than the size of the features which are need for recognition. If it is somewhat bigger, then shifted data can easily be detected by the present invention.

Figure 12:
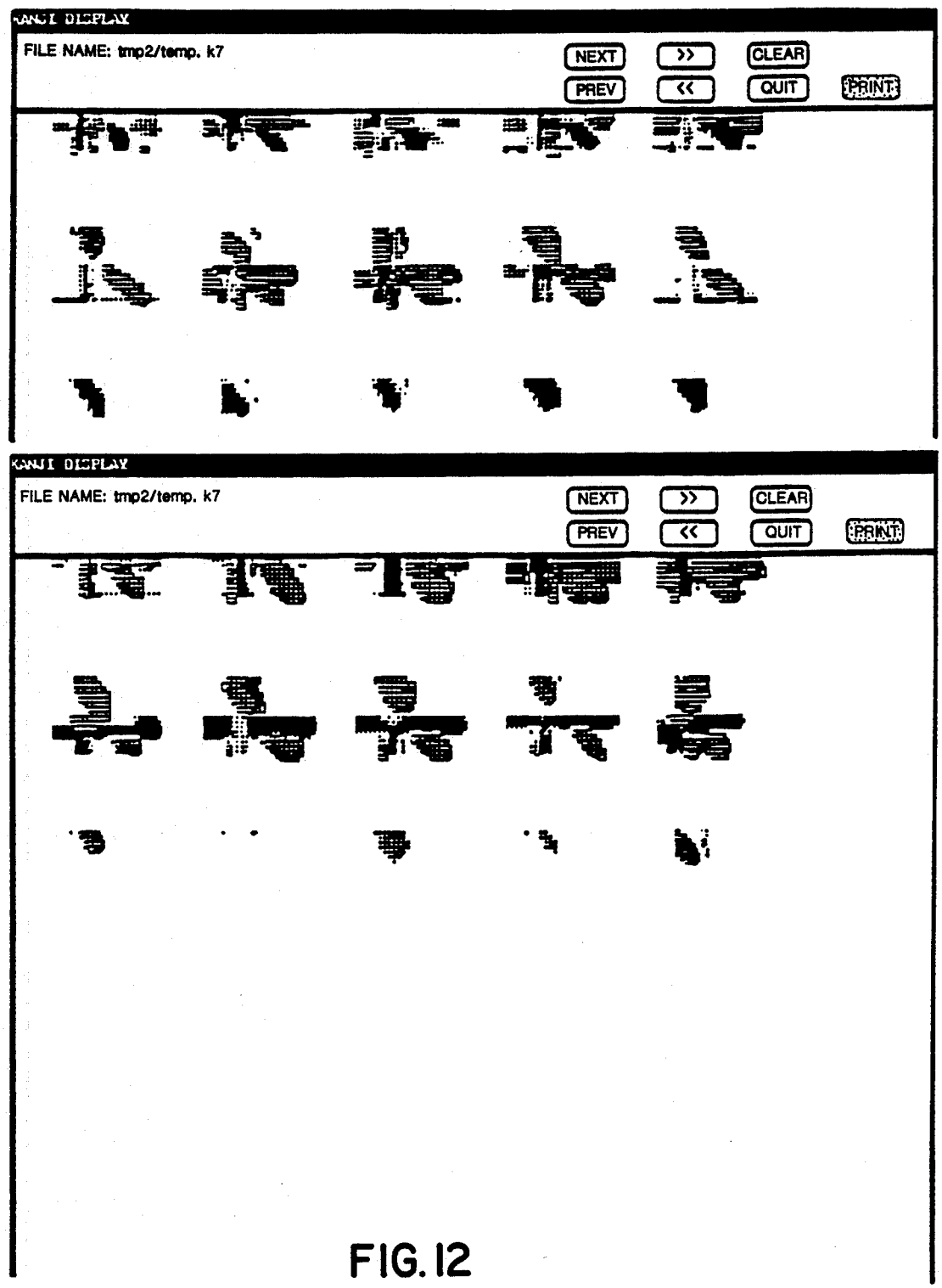

The reason the culled-out areas of FIG. 12 are different from the similar regions in FIG. 11 is that the normalization is carried out over the four receptive fields, rather than over the entire input character, as in FIG. 11. Thus, they differ only by the normalization factor.

These test results relate to five nodes for each character; this means that there were five examples of each character, as shown in FIG. 10. The test was run on 36 Kanji characters, having eleven subcategories, where each subcategory consisted of from two characters to four characters. FIG. 8 shows 24 of these 36 Kanji characters, and the contents of the subcategories.

The specified threshold determines the dividing line between "black" and "white." The actual data is read in a 1-byte gray scale, i.e., with 8 bits, or 256 gray-scale values. The black/white thresholds were set, for the experimental results, at a reading of 100 on the gray scale of 256, at a reading of 140 and at a reading of 180, respectively. The system of the invention uses a sliding gray scale, which may be set at any value between 0 and 255.

Figure 13:
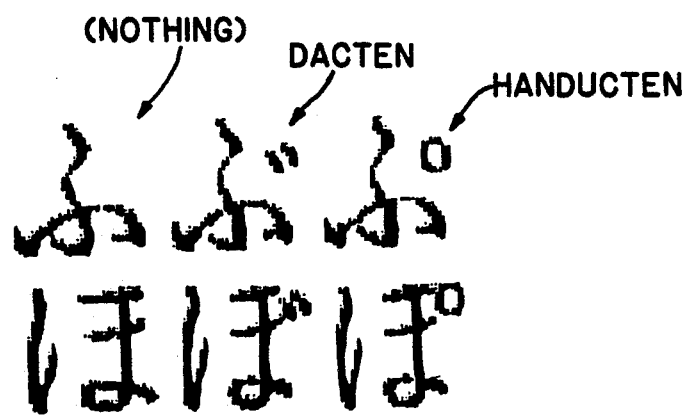
FIG. 13 represents weights of Hirakana characters.
Figure 14:
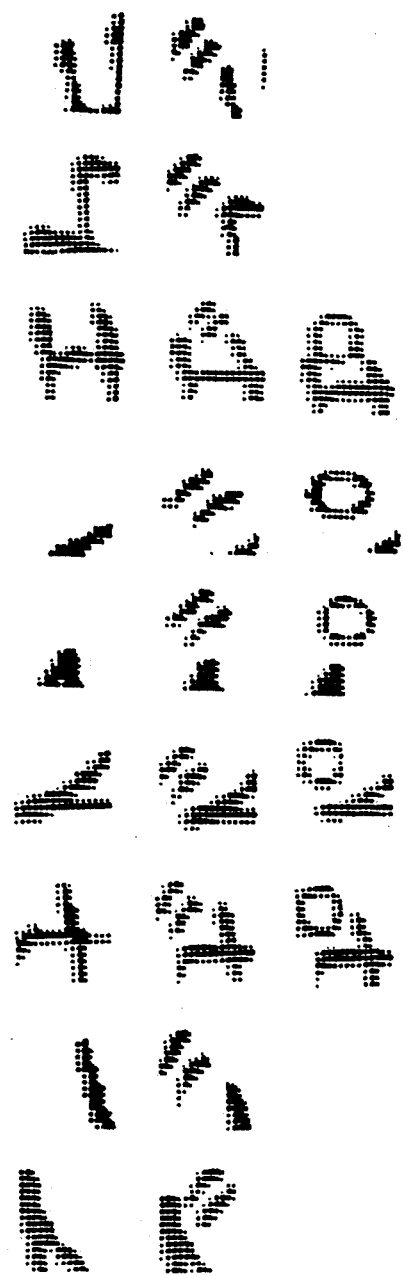
FIG. 14 shows weights of receptive fields for Hirakana characters.

FIG. 14 shows various input data in the receptive field located in the upper right corner of the input data, i.e. the characters shown in FIG. 13. The data of FIG. 14 were extracted from Hirakana characters, and are input images which are to be learned by the system of the invention. It will be noted that the lowest line of FIG. 14 has five images, and the small circle (or "Handucten") is in a different location in each one; for instance, the circle in the center image on the bottom line is lower. Similarly, the pairs of lines ("Dacten") appearing in the images in the center line are also in various positions. These input images are therefore good candidates for the shift-invariant procedure of Process 5, discussed below.

FIG. 13 shows six Hirakana characters. There are 169 total Hirakana and Katakana characters. In Hirakana, it is sufficient to use a single receptive field for a given subcategory of characters, since the characters include the Dacten, the Handucten, or nothing in the upper righthand corner, as shown in FIG. 13. Thus, a receptive field in the upper righthand corner suffices to distinguish these characters. This is the reason that the input images of FIG. 14 may be used.

Of course, this assumes that the characters have already been subcategorized into the appropriate categories. In this example, the entire field is 32×32 pixels, but the receptive field is 16×16 pixels. Thus, one receptive filed tile may be 12×12 pixels, shifted by the method described above within an input area of 16 ×16 pixels. This shifting may be done two pixels at a time, as the shifting in described above was carried out one pixel at a time. Other predetermined numbers of pixels may be used for the shifting process, and the amount of shifting in one dimension need not be the same as the amount of shifting in another dimension.

The 169 Hirakana and Katakana characters may constitute one subcategory of the approximately 4,000 characters for which the present invention would be utilized, mostly consisting of Kanji characters. Within the Hirakana classification, there are several subcategories, consisting of from approximately 1 to 3 characters. For most of these subcategories of characters, it is sufficient to use the upper right receptive field to determine whether there is a Dacten, a Handucten, or nothing in the upper right. Thus, there is a maximum of three outputs for each of these subcategories. Other subcategories may require different numbers or locations of outputs.

PROCESS 5

Apply Shift Invariance

Once the receptive fields are generated, the shift-invariant improvement on the previously discussed LVQ2' method can be utilized. Alternatively, the LVQ2' process can be used without shift invariance, but can be applied to the unshifted receptive fields of the present invention. Yet another alternative is to apply the following shift-invariant method to pattern recognition, but without the use of a plurality of receptive fields (where the entire field of the pattern may be viewed as one receptive field). In any of these embodiments, the present invention provides highly accurate character recognition.

Figure 16:
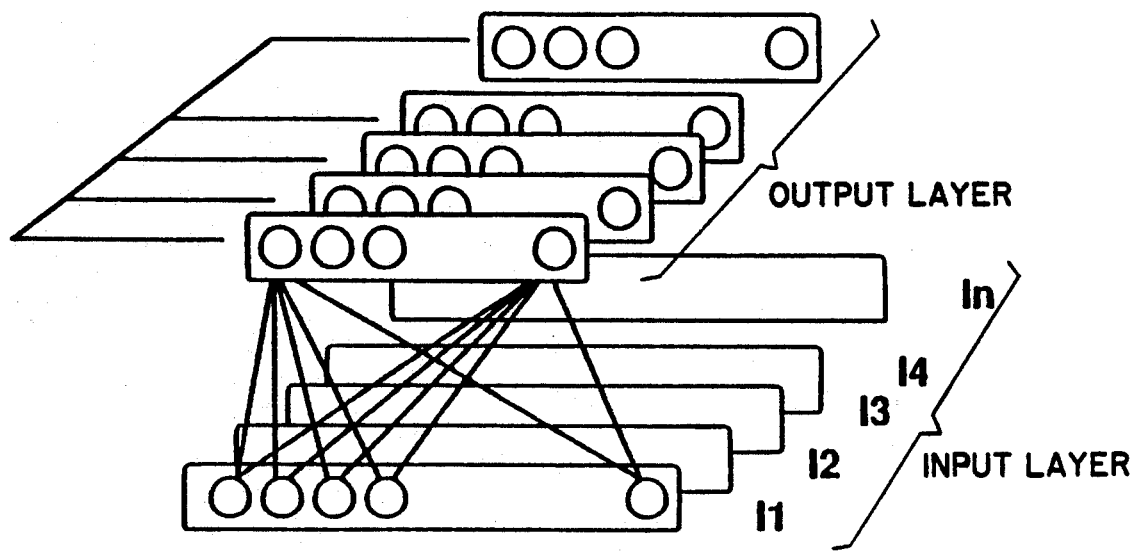
FIGS. 16 and 17 show a structure of the invention used in the shift-invariant method.
Figure 17:
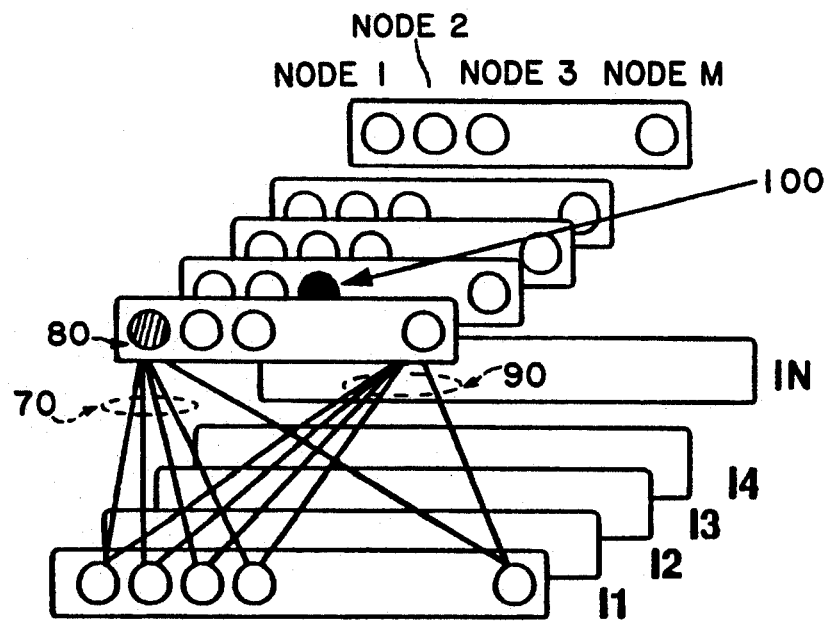

The shift-invariant method will first be discussed qualitatively, and then a more detailed, mathematical treatment will be given. The structure of the network for this purpose is shown in FIG. 16, and an example of it application is shown in FIG. 17. First, sub-input data I1 is fed into the network and output values are calculated. Second, sub-input data I2 is fed into the network and output values are calculated. In this case, the weights between output nodes and input nodes for I2 are the same as that for I1. All of the weight sets between output nodes and sub-input nodes are the same.

When the weights between the output nodes and the I2 sub-input node is updated, sub-input data I2 is used for changing the weights. In FIG. 17, this means that weight vectors 70 (encircled by the dotted line), which lead to the lightly shaded node 80, and similar weight vectors (not separately shown) leading to the heavily shaded node 100, are updated. Other such weights 90 are represented, leading to other nodes.

Node 100 in FIG. 17 represents the maximum value generated for a node in the correct class, and node 80 represents the maximum value generated for a node in an incorrect class. The weights are updated based on the results of nodes 80 and 100, as described below in detail relative to FIGS. 19, 20 and 24.

There are very similar characters in Japanese; for instance, FIG. 13 shows six Japanese characters. Upper or lower three characters have almost the same shape except two spots or one small circle.

These two spots ("Dacten") or small circle ("Handucten") always appear on the upper right-hand one-fourth area in these Japanese characters. FIG. 14 shows approximately one-fourth of the total area of these characters. The characters on the bottom line have a small circle, those in middle line have two spots and those on top have neither a small circle nor spots. If these three categories are distinguished, recognition of such characters can be made highly accurate. Therefore, it is important that the system learn the weights for these features. An actual implementation of a network according to the invention extracted the two spots and a small circle shown in FIG. 15, as discussed in further detail below.

Figure 22:
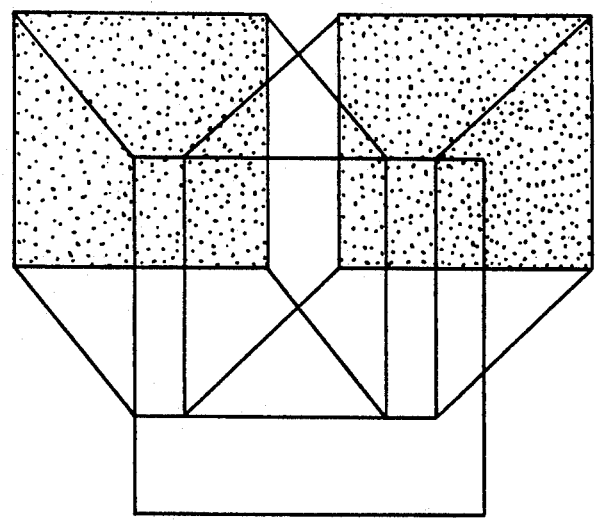
FIGS. 22 and 23 show examples of different input vectors for the shift-invariant method.
Figure 24:
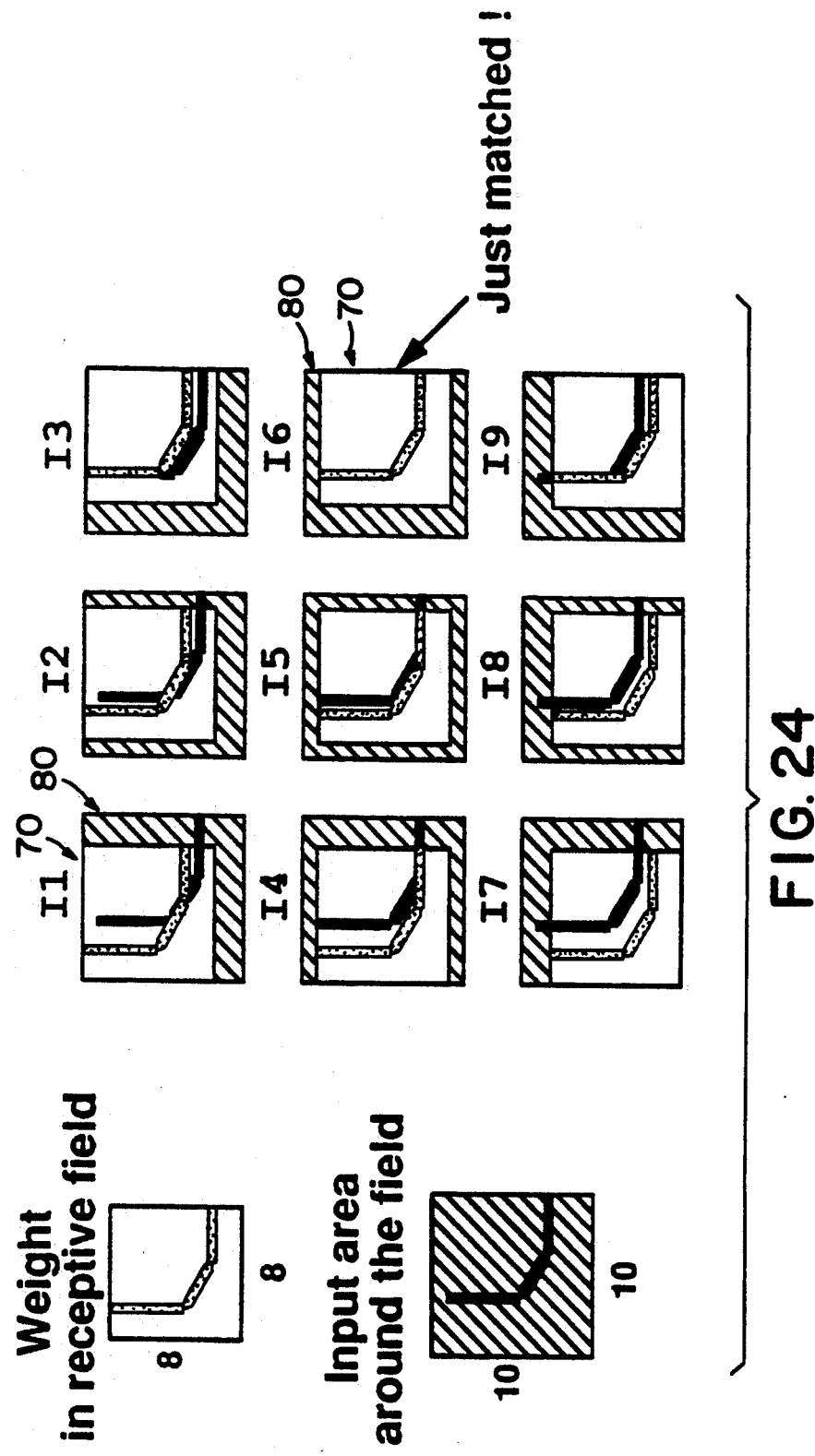
FIG. 24 shows different position of receptive fields generated by the shift-invariant method.

Referring now to FIG. 24, each of the receptive fields 70 is shifted in position around its center within a larger input area 80, in order to compensate for a possible shift in the input position of the character. Thus, image I5 in FIG. 24 shows the position of the receptive field as it is input in this example. The shaded portion of the image illustrates the weight in the receptive field, whereas the solid black image shows the input area around the receptive field, which remains invariant. See also FIG. 22, which shows an enlargement of images I1 and I2.

Figure 23:
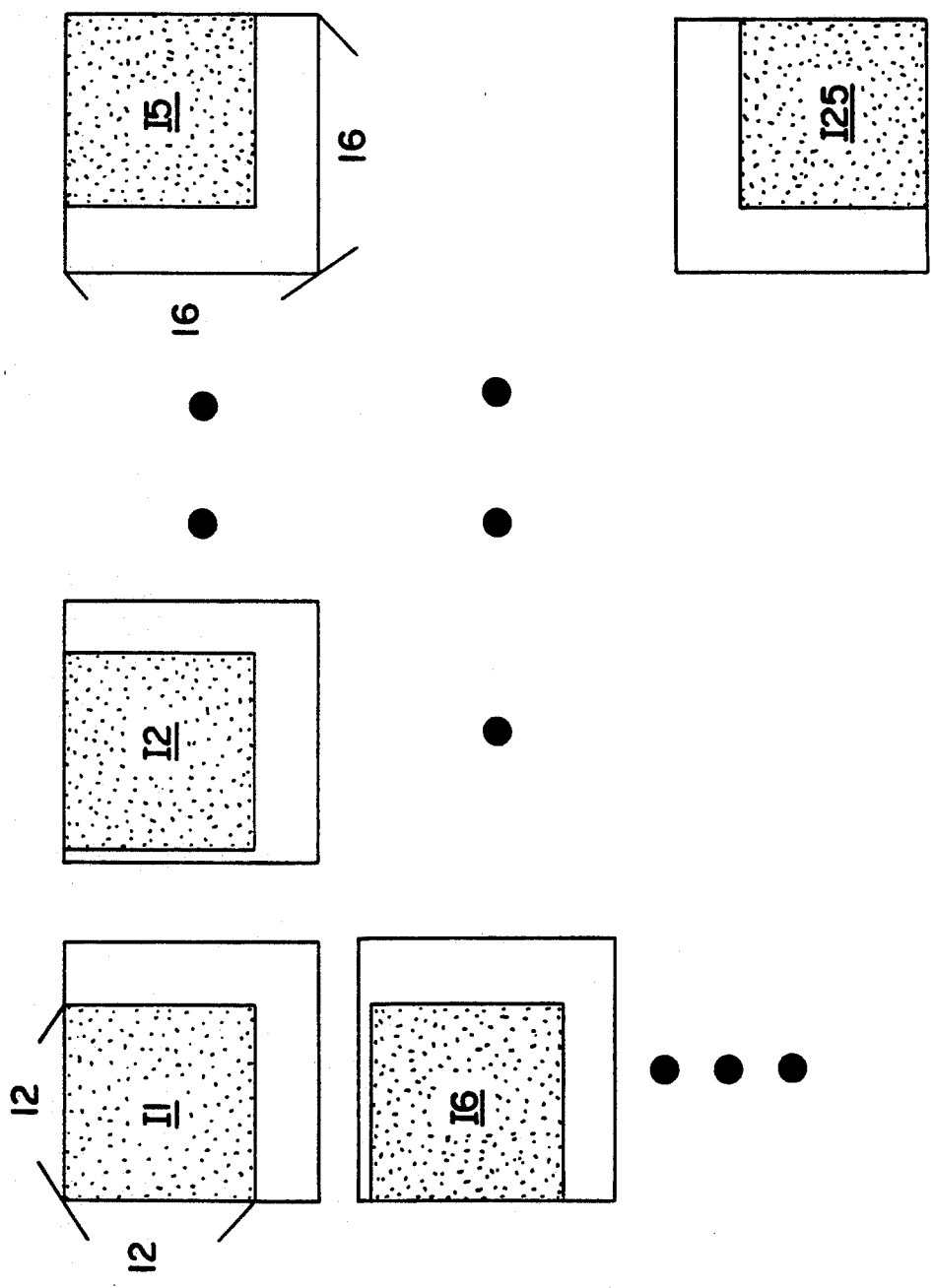

FIG. 23 shows an alternative configuration for the shifting of the receptive fields, wherein the input area is configured in a 12×12 matrix and the receptive field is configured in a 10×10 matrix, and is shifted one pixel at a time in each of two directions (negative and positive) for each of two dimensions (horizontal and vertical). That is, the receptive field is shifted to the left (negatively) two pixels in the horizontal dimension and upwards (positively) two pixels in the vertical dimension to generate image I1. Image I2 is generated by shifting the receptive field one pixel to the left, and two pixels up. Other images are generated in similar fashion, with image I25 being generated by shifting the receptive field two pixels in the positive direction (i.e., to the right) in the horizontal dimension and two pixels in the negative direction (i.e., downward) in the vertical dimension. It will be appreciated that image I13 (not shown) in FIG. 23 would represent the unshifted image.

Referring again to FIG. 24, Images I1–I9 show the relative positions of the shaded image and the black image for different shifted positions of the receptive field. It is helpful here also to refer the generalized architecture shown in FIG. 17.

The receptive field in this example is an 8×8 pixel array, whereas each of the input image areas I1–I9 is in a 10×10 pixel field. (It will be understood that other sizes may be used, such as the 12×12 receptive field within the 16×16 input image area shown in FIG. 23.) Thus, while image I5 represents the centering of the receptive field on the input area, I4 represents the shifting of the receptive field one pixel to the left relative to I5. Likewise, image I2 represents the shifting of the receptive field one pixel up, and image I1 illustrates a shifting both one pixel to the left and one pixel up. The other input areas I, shown in FIG. 5, are also shifted by either zero or one pixel horizontally or vertically, to the right or to the left, as illustrated. In other size configurations, such as the alternative mentioned in the preceding paragraph, there may be one, two or more shifted positions available in each horizontal and vertical direction, or in receptive fields which are rotated about an axis or are otherwise shifted The receptive fields have a shift-invariant ability in the sense that the position of each receptive field is selected so that the receptive field corresponds as closely as possible to the input vector, which may appear in any of a number of possible positions around the receptive field In the example of FIG. 24, the method of the invention will yield a right-shifted result as in I6, where the input data and the learned data just match.

The learning process changes the input data's weight vectors to move the largest-valued receptive-field weight vector which belongs to the same class as the input character closer to the input vector in its best matched position around each receptive tile (field). In addition, it moves the largest-valued receptive-field weight vector which is in a class other than the correct class for the input character farther away from the input vector in its best matched position around each receptive tile (field).

Figure 24A:
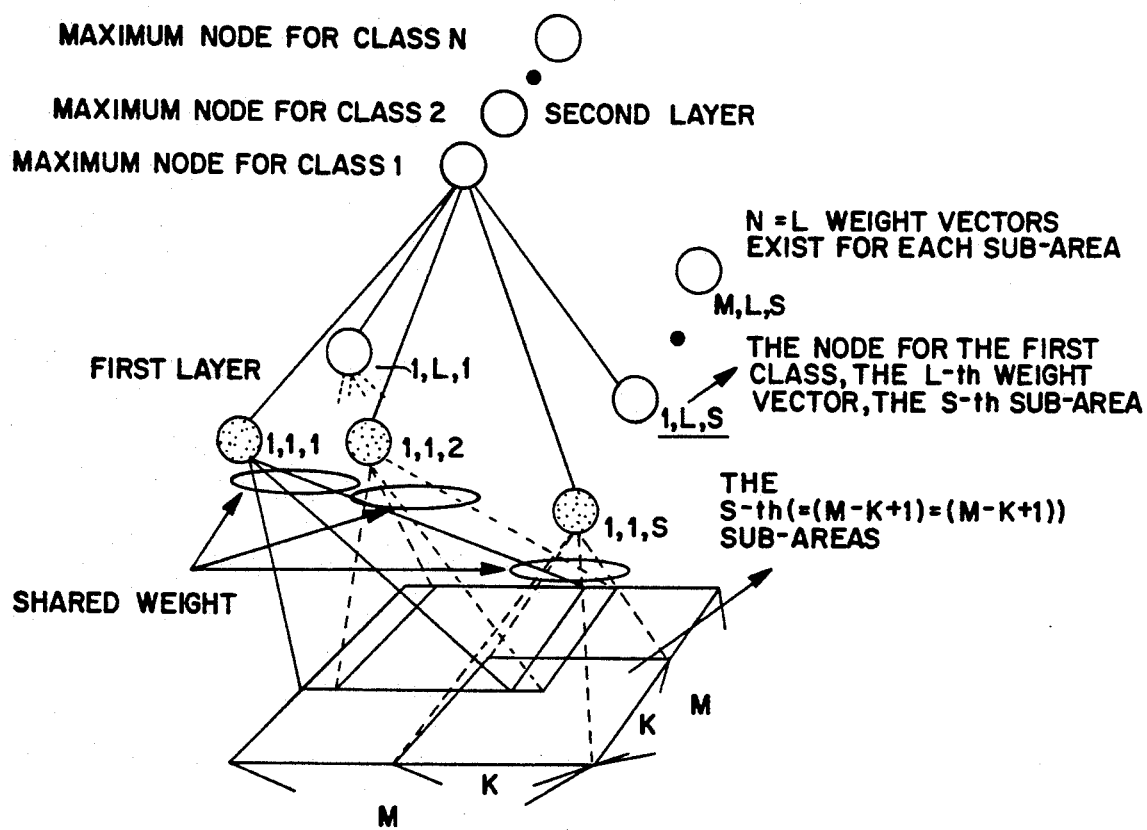
FIG. 24A shows the architecture of a generalized version of the shift-invariant system of the invention.

The following description relating to FIG. 24A is a more generalized version of the above specific discussion relating to FIG. 24. This shift-tolerant learning vector quantization (which in this description shall be referred to as STLVQ) bears some resemblance to the Learning Vector Quantization 2 (LVQ2) proposed by Kohonen, but with important changes.

FIG. 24A shows the STLVQ architecture, consisting of two layers In the first layer, the inner products of input data and weight vectors are calculated. In the second layer, the maximum output values of each class are selected The input to the network is an M-by-M image and the output is composed of N nodes which correspond to N classes. The first layer has the following structure.

Each node has a local receptive field whose size is K by K ($M < K$). (In the embodiment of FIG. 24, $M = 10$ and $K = 8$.) The size of the receptive field is a little bigger than, or equal to, the size of the feature which is essential to recognition.

The size of the input data is large enough to encompass the possibly shifted features. Each node covers a K-by-K subarea extracted from the M-by-M input image. Since subareas are laid to overlap each other, the total number of subareas S is $(M-K+1) \times (M-K+1)$. (In the embodiment of FIG. 24, $S=9$.) For each subarea, there are $N \times L$ nodes and $N \times L$ weight vectors, where N is the number of classes and L is the number of the nodes for a class. (In the embodiment discussed above, as represented in FIG. 10, $N=4$—i.e., there are four different characters—and $L=5$, for the five different fonts or representations of each character.)

To achieve shift-invariant matching, the weight-sharing technique is applied to the architecture of FIG. 24A. A set of $N \times L$ weight vectors for a subarea is constrained to be equal to a set of weight vectors for any other subareas. In total, $N \times L \times S$ nodes and $N \times L$ shared weight vectors exist in the first layer. To obtain output values, the inner products between the weight vectors and the subarea data are calculated. Thus $N \times L \times S$ ($=180$ for FIG. 24) output values are calculated for each input datum according to equation (101) below. All nodes which belong to the same class are connected to a node in the second layer:

$$O_{1nls} = W_{nl} \cdot X_s; n=1,\ldots,N, l=1,\ldots,L, s=1,\ldots,S \quad (101)$$

where:

$O_{1nls}$ is the output value of the node in the first layer;
$W_{nl}$ is the lth weight vector of the nth class; and
$X_s$ is the sth subarea data.

The second layer has N nodes which correspond to N classes. The nodes in the second layer select the maximum value of $L \times S$ values according to equation (102):

$$O_{2n} = \max\{l=1,L;s=1,S\}(O_{1nls}),$$

where
$O_{2n}$ is the output value of the nth class in the second layer.

In the recognition mode, the node which has the maximum output value in the second layer is found, and the category to which the node belongs is the recognition result. Because the weight vectors are matched with all subarea data, the output value of the correct node keeps a high value even if the input data is shifted.

In the learning mode, the STLVQ learning is carried out as follows. If the closest (largest output value) class, W, in incorrect and the second closest class, C, is correct, the following procedure is carried out:

Select the maximum value $O_{2w}$ and the second maximum value $O_{2c}$ in the second layer.

$$O_{2w} = \max\{n=1,N\}(O_{2n}) \quad (103)$$

$$O_{2c} = \max2\{n=1,N\}(O_{2n}), \quad (104)$$

where max2() is the function for selecting the second maximum value.

In the first layer, weights are updated as follows:

$$O_{1WIJ} = \max\{l=1,N,s=1,S\}(O_1W_{ls}) \quad (105)$$

$$W_{WI}(t+1) = W_{WI}(t) - \alpha(t)(X_j(t) - W_{WI}(t)) \quad (106)$$

where:

$\alpha(t) = 0.1 \times (1 - t/T)$
T = the maximum number of iterations;
t = the current number of iterations; and
t is incremented after all input data are fed into the network (one iteration).

$$W_{WI}(t+1) = \frac{W_{WI}(t+1)}{|W^{WI}(t+1)|} \quad (107)$$

where $|W_{WI}(t+1)|$ is the norm of $W_{WI}(t+1)$.

$$O_{1CPQ} = \max\{l=1,N;s=1,S\}(O_{1Cls}) \quad (108)$$

$$W_{CP}(t+1) = W_{CP}(t)(X_Q(t) - W_{CP}(t)) \quad (109)$$

$$W_{CP}(t+1) = \frac{W_{CP}(t+1)}{|W^{CP}(t+1)|} \quad (110)$$

In this learning apparatus and method, one weight vector out of $N \times L$ weight vectors and one subarea out of $(M-K+1) \times (M-K+1)$ subareas are chosen. Since this procedure selects the appropriate location of the input data, STLVQ can learn the proper weight vectors for recognition wherever the input feature is shifted.

Figure 19:
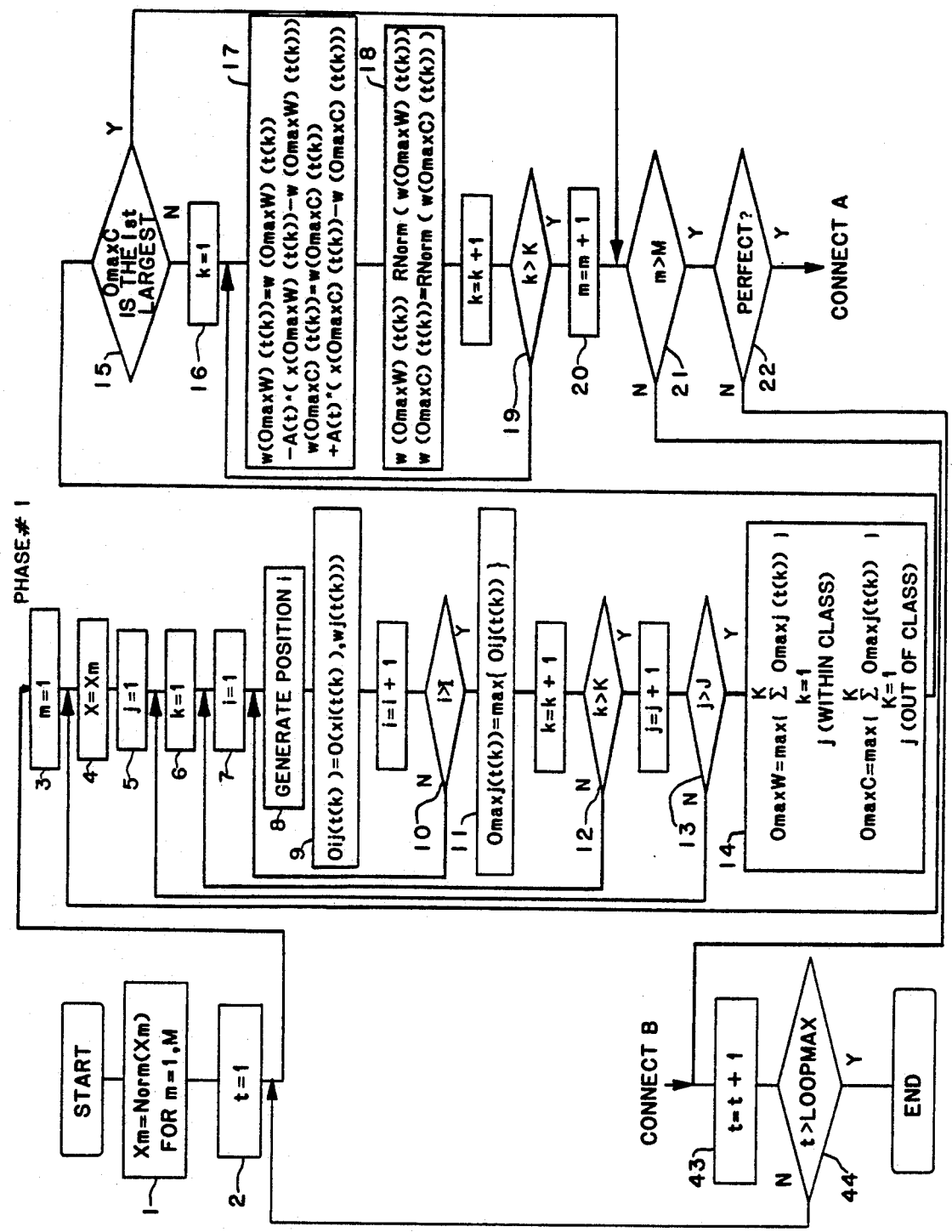
FIGS. 19–20 are flow charts depicting the shift-invariant method of the invention.
Figure 20:
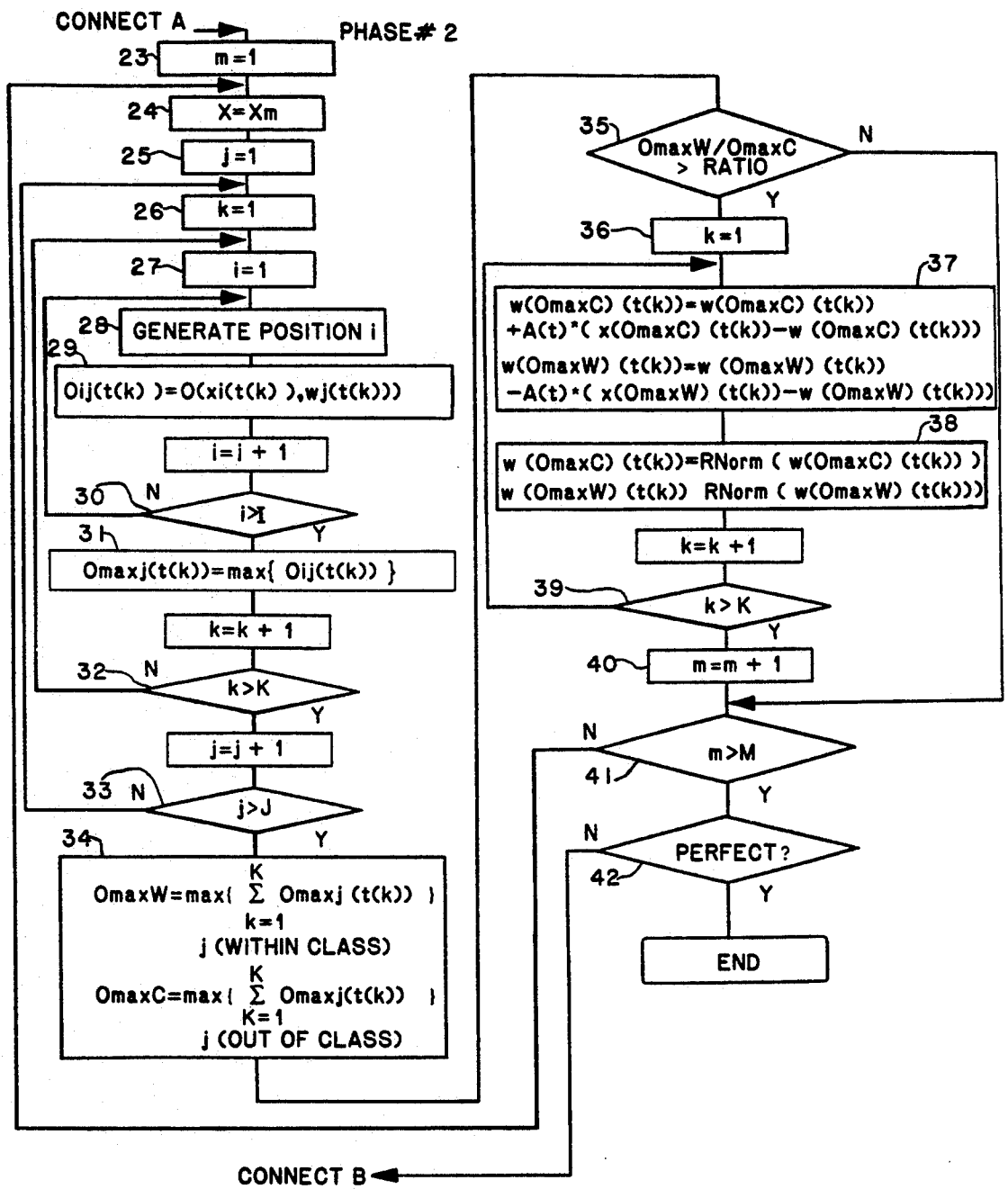

The following method outline corresponds to the flow charts of FIGS. 19 and 20, and sets forth in detail how the above process is carried out:

$Xm = \text{Norm}(Xm)$ for $m = 1, M$: Normalization (14)
For $t = 1, T$; Number $t$ of learning iteration
{
 [Phase #1]
 {
 For $m = 1, M$; Number $m$ of input vectors
 {
  $X = Xm$; Input vector $X$ represents $Xm$ of (15)
   input vector $m$ which is assumed
   to belong to class $n$
  For $j = 1, J$; Number $j$ of weight vectors
  {
   For $k = 1, K$; Number $k$ of contributive tiles
   {
    For $i = 1, I$; Generate shifted different
      position $i$ of a tile $t(k)$ on
      input vector $X$
    {
     $Oij(t(k)) = O(xi(t(k)), wj(t(k)))$ (23)
    }
                              (24)
    $Omaxj(t(k)) = \max_{i}\{Oij(t(k))\}$: to find a
                              best position
   }
  }                           (25)

$OmaxC = \max\{ \quad \text{SUM} \quad Omaxj(t(k))\}$
         $k = 1, K$
         $j$ within class $n$
                              (26)

$OmaxW = \max\{ \quad \text{SUM} \quad Omaxj(t(k))\}$
         $k = 1, K$
         $j$ out of class $n$ If $OmaxC$ is ranked at the 2nd overall largest
  output or the nth ($n > 2$) one and $OmaxW$ is ranked
  at the overall first largest output,
  {
   For $k = 1, K$
   {
                              (27)
    $w(OmaxW)(t(k)) = w(OmaxW)(t(k)) - A(t)*$
    $(x(OmaxW)(t(k)) - w(OmaxW)(t(k)))$
                              (28)
    $W(OmaxC)(t(k)) = w(OmaxC)(t(k)) + A(t)*$ -continued
```
    (x(OmaxC)(t(k)) - w(OmaxC)(t(k)))
   }
  For k = 1, K
   w(OmaxW)(t(k)) = RNorm(w(OmaxW)(t(k)))         (29)
   w(OmaxC)(t(k)) = RNorm(w(OmaxC)(t(k)))         (30)
  }
 }
}
}
If all input vectors are perfectly learned in Phase #1,
go to Phase #2.
If not, go to Phase #1 again.
[
Phase #2]
{
 For m = 1, M; Number m of input vectors
 {
                                                  (15)
  X = Xm; Input vector X represents Xm of input
          vector m which is assumed to belong to
          class n
  For j = 1, J; Number j of weight vectors
  {
   For k = 1, k; Number k of contributive tiles
   {
    For i = 1, I; Generate shifted different position
                 i of a tile t(k) on input vector X
    {
     Oij(t(k)) = O(xi(t(k)), wj(t(k)))            (23)
    }
                                                  (24)
    Omaxj(t(k)) = max{Oij(t(k))}; to find a best position
                   i
   }
 }
                                                  (25)

OmaxC = max{    SUM      Omaxj(t(k))}
               k = 1, K
              j within class n
                                                  (26)

OmaxW = max{    SUM      Omaxj(t(k))}
               k = 1, K
              j out of class n If a ratio of OmaxW to OmaxC > RATIO,
 {
  For k = 1, K
  {
   w(OmaxC)(t(k)) = w(OmaxC)(t(k)) +              (28)
    A(t)*(x(OmaxC)(t(k)) - w(OmaxC)(t(k)))
   w(OmaxW)(t(k)) = w(OmaxW)(t(k)) -              (27)
    A(t)*(x(OmaxW)(t(k)))
  }
  For k = 1, K
   w(OmaxW)(t(k)) = RNorm(w(OmaxW)(t(k)))         (30)
   w(OmaxC)(t(k)) = RNorm(w(OmaxC)(t(k)))         (29)
  }
 }
}
If all input vectors pass through Phase #2 without any
change of weight vectors W, stop. If not, go to Phase
#1 again.
}
```

The variables are defined as follows:

t(k): Tile number, which tile is the most k-th contributive one.

xi(t(k)): Input vector around a tile t(k) which is located in shift position i of the weight vector of a tile t(k).

wj(t(k)): Weight vector of a tile t(k) of weight vector j x(OmaxC)(t(k)): Input vector in the best position around a tile t(k) to give the largest output OmaxC which belongs to the same class as the input vector X.

w(OmaxW)(t(k)): Weight vector of a tile t(k) to give the largest output OmaxW which belongs to other classes (wrong class) than the same class as the input vector X.

$$x(t(k)) = RNorm(x(t(k))): \quad (31)$$

$$xi(t(k)) = xi(t(k)) / \sqrt{\Sigma xi(t(k)) * xi(t(k)))} ,$$

$k = 1, K$
$i = 1, I$
for $i = 1$ to $I$.

RATIO: A constant value; for instance RATIO=0.5

The above-outlined shift-invariant LVQ2' method will now be discussed relative to FIG. 24. First, the vectors Xm are normalized in the manner described earlier (see Equation (0) above). T is set to the desired number of learning iterations, and may for example be 20. M is set to the number of input vectors, and in the example discussed above is 49. J is set to the number of weight vectors belonging to class n, and N is the total number of classes of patterns to be recognized. One or more weight vectors are calculated for each of the N classes, such as the five weight vectors are generated for each of the N=4 classes shown in FIG. 10.

In step 4 of FIG. 19 (Equation 15 above), X is set equal to Xm, initially assuming that input vector Xm belongs to the class n.

It will be noted that Equations 15 and 23-30 are utilized above both in Phase #1 and in Phase #2. However, these phases have different purposes. Phase 1 implements weight updates in such a way that the recognition of the characters or patterns is carried out perfectly, or until the variable t reaches the value LOOPMAX (which in the example may be 20). This bears some similarity to Phase #1 of FIG. 3B above, with the important introduction of the t(k), where k goes from 1 to K. K is the number of contributive tiles being considered, and in the exemplary embodiment is 4. Equations 23-30 are new in this step, not being used in the procedure of FIG. 3B.

In Equation 23 (step 9 in FIG. 19) above, $O_{ij}$ refers, in the first instance, to image I1 in FIG. 24. That is, $O_{1j}$ would relate to image I1 in FIG. 24, $O_{2j}$ would be image I2 in FIG. 24, etc. "xi(t(k))" refers to tile number "k". Thus, t(k) is one of the four tiles selected as a contributive tile. xi(t(k)) refers to the specific shifting (1-9) shown in FIG. 24 for the given tile t(k). The inner product is taken in Equation 23 (step 9 in FIG. 19), and thus an array $O_{ij}$ for each tile t(k) is generated.

In Equation 24 (step 11 in FIG. 19), the maximum $O_{ij}$ (Omaxj) is determined, in order to find the best position i (i goes from 1 to 9). For instance, in FIG. 5, for that particular tile, i=6 generates the best position. Thus, the best fit for the shifted tiles is determined. Omaxj is set equal to this best fit, i.e., the maximum Oij generated by Equation 23 (step 9).

In Equation 25 (step 14, second equation), the values of the best fits generated by Equation 24 are added up in all possible combinations for the four receptive field tiles. That is, the values of Omax for the best fit for each of the four tiles are added up. By Equation 25, the highest value (OmaxC) for a weight in the correct category as the input character is moved closer to the learned weight for that category. In similar fashion, by Equation 26, the highest value (OmaxW) for a weight in an incorrect category (i.e. a category other than the input character) is moved farther from the learned weight for that category.

For example, in FIG. 21, each 10×10 positioning area is approximately 1/10 of the total area of the 32×32 array (since 32×32=1024). Thus, where Omaxj in Equation 24 might be anywhere from, for instance, 0.8 to 0.98, OmaxC in Equation 25 (step 14) will be the sum of the four best numbers, and therefore might be something like 0.85 (e.g., 0.85=0.2+0.21+0.24+0.2). It will be noted that the normalization RNorm (see Equation 31) is carried out over the four receptive field weight vectors.

The designation "C" designates the best value for an identified character, in the correct category. This is in the learning mode, so the computer knows which is the correct category. The designation "W" refers to the best value in an incorrect (wrong) category. Again, the computer knows whether the category is correct or incorrect. In this way, using Equations 25 and 26, the method returns the highest-valued vector for the correct class (i.e. a correct recognition) as well as the highest-valued vector for an incorrect class.

Thus, for Inu, the values 0.9, 0.85, and 0.8 might be generated. If Inu is the correct character, OmaxC is set equal to 0.9. Similarly, for the character Futoi, the values 0.45, 0.4 and 0.35 might be generated. In this case, the value of OmaxW is set equal to 0.45, i.e., the highest Omax value for the wrong character.

In order to carry out the above procedure, the CPU 120 and the processor nodes 190–220 shown in FIG. 1B communicate all necessary data and variables to one another, with program instructions for carrying out the procedure being stored in the memory 130. The memory includes both RAM and ROM for this purpose.

Thus, the 32×32 image, after processing according to the above description, is communicated to the processor nodes 190–220, and these nodes calculate and return values for Oij according to the above formulas and methods. In this way, overall program control is implemented in the CPU 120, while node-specific processing is carried out by the local processor nodes.

The outputs of the processor nodes 190–220 comprise a matrix 270 which has dimensions M×N (M input vectors times N sub-input data). One of the values of this matrix will be value 280 or OmaxC, and another will be value 290 or OmaxW, which are utilized in the updating of the weight vectors in the manner describe above.

It is possible that OmaxC will be less than OmaxW, i.e., that a wrong character actually generates an Omax value which is larger than a correct character. If this happens, the procedure of Equations 27 and 28 (step 17 of FIG. 19) is followed. Equation 27 makes OmaxW smaller, by moving W(OmaxW) farther away from X(OmaxW)(t(k)). Conversely, Equation 28 makes OmaxC larger, by moving W(OmaxC) closer to X(OmaxC)(t(k)). These slight updates on W(OmaxW) and W(OmaxC) thus compensate for the incorrect result, i.e. the generation of an OmaxW value which is large than the OmaxC value.

It will be appreciated that in the recognition mode using the neural network of the invention, the class of the node with the maximum output value of the all the output values is selected as the recognition result. Thus, when a character is processed according to this network, it will be identified as the character whose weight most closely matches its output value. This is also true in the recognition mode for the learning procedure; that is, the learning procedure also uses this recognition procedure to test whether a given input character is properly identified, based upon the learned weights.

The receptive-fields feature of the invention may be used without using the shift-invariant feature. However, the use of OmaxC and OmaxW is preferable, because it contributes significantly to the efficiency and accuracy of the present invention.

Conversely, if K=1 in FIG. 19, this results in the use of the shift-invariance procedure without using multiple receptive fields—in effect, using the entire field as one receptive field. This is a useful variation wherein the entire input pattern is shifted instead of only one part. The receptive field is in this example equal (or may alternatively be nearly but not quite equal) to the size of the entire input array.

These two examples are the extremes in the continuum: (1) using one to many receptive fields; and (2) using one to many shifted position input areas in the shift invariance procedure.

Weight updating is finally carried out by Equations 29 and 30 (step 18 in FIG. 19). This completes Phase #1 of the shift-invariance procedure.

The method of the invention goes through the recognition procedure again to determine, with the updated weights, whether the correct outputs are generated (step 22, FIG. 19). If so, then Phase #2 is entered, and if not, Phase #1 is repeated. Phase #2 is the method for generating $R_i$ is less than 0.5 for all i, analogous to Phase #2 as described above for the LVQ2' method (see Process 2 discussion, above).

In Phase #2, the weight changing is done by Equations 27 and 28 (step 37 of FIG. 20) under the condition that a ratio of OmaxW to OmaxC>RATIO, so that the overall largest output value of the correct class can be kept further away from the overall second largest output value of wrong classes. This is similar to the procedure followed in Equations (19) and (20) in process 2 (LVQ2') above, but applied to the shift-invariance procedure.

It will be appreciated overall that a primary thrust of the shift-invariance method is the setting up of the best position for the weight in the receptive field into the input area around the field.

FIG. 12 shows the result of the application of the shift-invariant process to the weight vectors shown in FIG. 11 (which were in turn, it will be recalled, generated by the application of Process 2 to the initialized weight vectors of FIG. 10). It can be seen that the areas which would be covered by the receptive fields C3, C5, C7 and C46, shown in FIG. 5, as overlaid upon the characters of FIG. 11, appear in FIG. 12.

Thus, FIG. 11 shows weight vectors which were trained by Process 2 in an actual implementation of the invention. In this figure, the black squares represent + (plus) weights, and the sizes thereof represent magnitude. Similarly, the white square presents − (minus) weight, and again the size or area represents the weight's magnitude FIG. 12 shows weight vectors which were trained by Process 5 after setting the receptive field by Processes 3 and 4 as shown in FIGS. 5–7.

Figure 15:
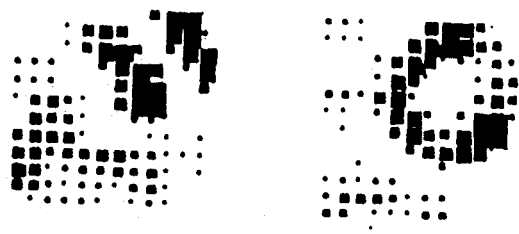
FIG. 15 shows two examples of receptive fields as in FIG. 14, after processing by the shift-invariant method of the invention.

FIG. 15 shows the resultant receptive field weight vectors (a "Dacten" on the left and a "Handucten" on the right), which were actually generated from the input data of FIG. 14 by the shift-invariant method of Process 5. Comparing this with FIG. 13, it can be seen that the distinguishing features among the different characters have been efficiently isolated and accurately rendered in the weight vectors of FIG. 15—even though, as seen from an inspection of FIGS. 13 and 14, the sub-input data (the blank spot, the Dacten, and the Handucten, respectively, in the upper right of the characters) appeared in many different relative locations in the input data of FIG. 14.

The two weights shown in FIG. 15 might relate to a subcategory of Hirakana characters with only two characters in the subcategory; or they might relate to a subcategory where one character has the Dacten, one has Handucten, and one has nothing. The actual data utilized in generating the results of FIG. 15 came under the latter subcategory.

Figure 25:
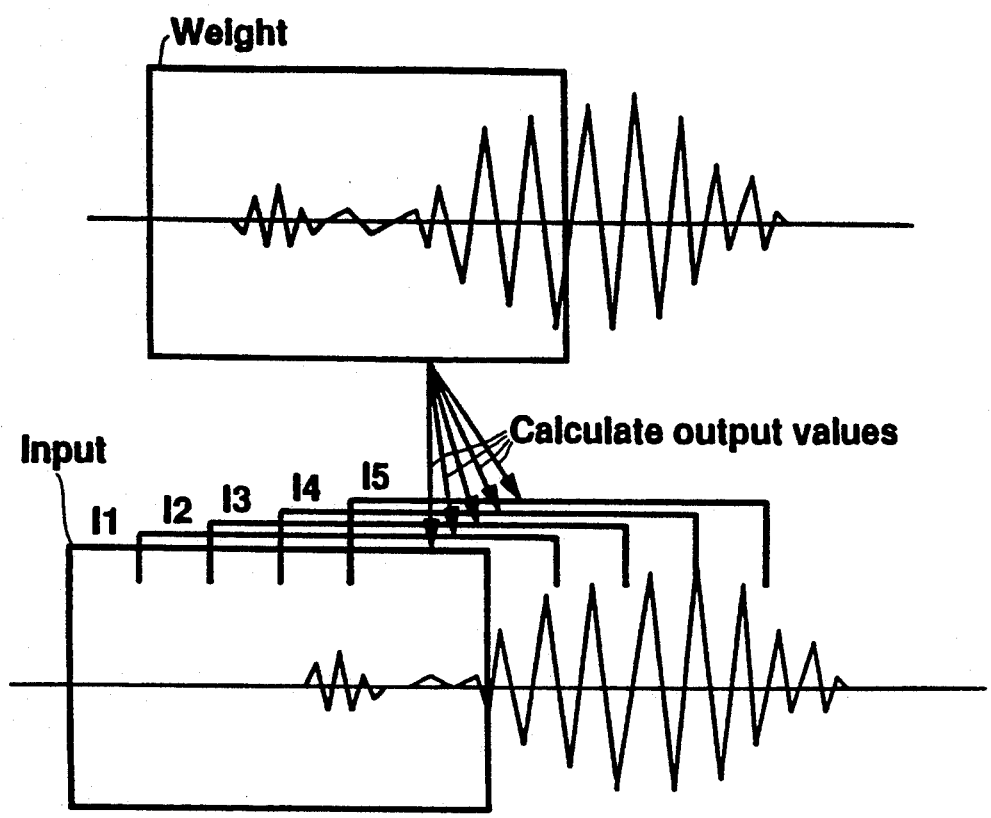
FIGS. 25 and 26 depict the application of the shift-invariant method to speech recognition.
Figure 26:
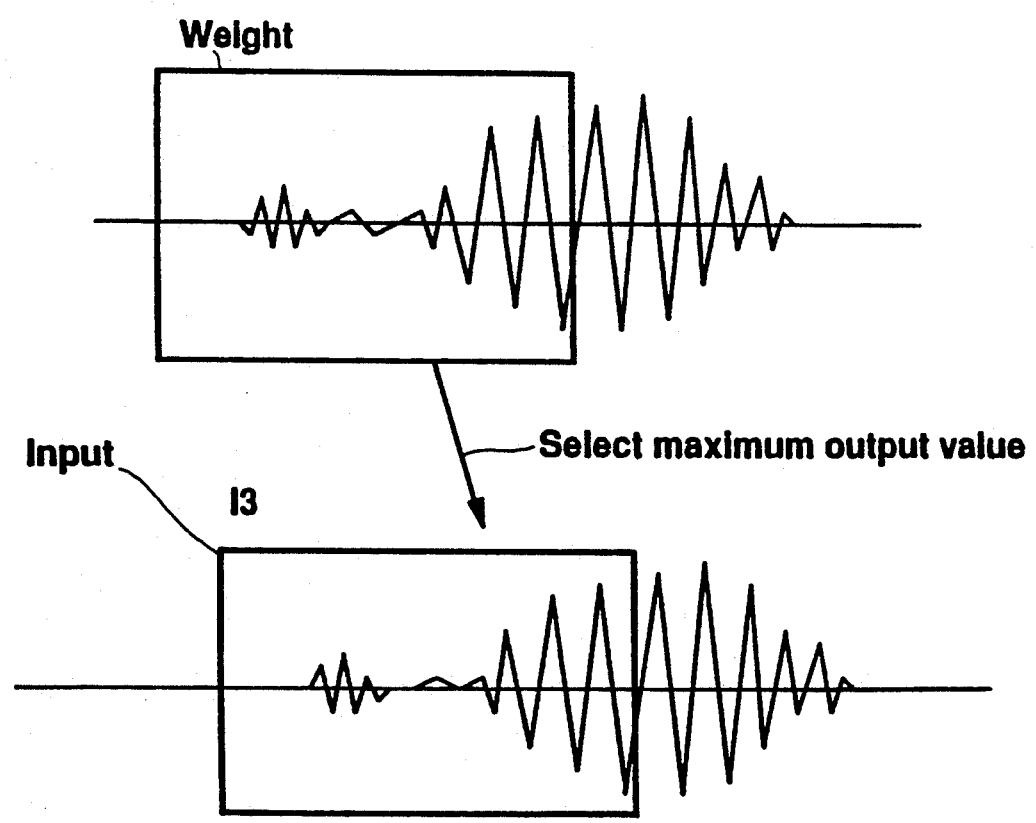

FIGS. 25 and 26 illustrate an application of the method of the invention to speech recognition, from which it can be seen that the method is equally applicable to one-dimensional data.

The top of FIG. 25 shows the weight vector for a given input data example. For instance, this might represent the syllable "ka" (or some other vocalized syllable). The bottom of FIG. 25 represents the shifting of the data under the shift-invariance method, in this example showing five shifts of the input data.

The weight vector of the waveform represented at the top of FIG. 25 is compared with all of the shifted sub-input data I1 through I5 of the waveforms for the learning process. A frequency-versus-time spectrum domain may be established in the same manner as in the TDNN method of Waibel. This is to compensate for time shifting of the input data. However, in the manner described above, shifting in the present invention is carried out before update of weights.

The best match (I3 in FIG. 26) of images I1-I5, shown in the bottom of FIG. 25, is selected for the weight vector in the top of FIG. 26. Thus, the method of the invention is readily adaptable to the environment of speech recognition. In similar manner, it can be used in conjunction with a variety of types of data for pattern recognition.

Test Results

Table 2 below shows the accuracy of the invention both with and without the receptive field procedure. These results demonstrate that the receptive field method with shift-invariant learning generated zero errors for the test data which were run:

TABLE 2

| Method | Recognition Results | |
|---|---|---|
|  | Accuracy (%) | # of correct/total |
| 1 | 98.34 | (921/936) |
| 2 | 99.68 | (933/936) |
| 3 | 100.00 | (936/936) |

The factors involved in these tests were as follows:

Test Receptive field of 4 tiles with Shift-invariant Networks

Input data: 32*32 mesh
Node: 5 nodes for each character
A tile: 8*8
Its shift area: 10*10
on a cluster of 36 Kanji characters, which has 11 subcategories (from 2 characters/subcat. to 4 characters/subcat.).

Data

Learned by 13 fonts * 3 thresholds (100,140,180)

Test on another 13 fonts * 3 thresholds (100,240,180)

Recognition methods

The recognition methods used to generate the results of Table 2 were as follows:

Method 1. Whole input field (32*32 mesh) without receptive fields

Test on weights after trained for T=20 iterations by LVQ2' learning through Process 1 & 2.

The test fed input character vector into X in step 4 in Process 2 and then executed step 5 through step 10 to get the result (Correct in the case that the largest output belonged to the same class as input character vector (Y in step 10), or error in the case that the largest output belonged to other classes than the same class (N in step 10).

Method 2. Receptive fields with No shift-invariant network

Test on weights after trained for T=20 iterations by LVQ2' learning with receptive fields using weights initialized by method 1 through Process 1, 2, 3, 4 and Process 5 without generation of positions (I=1 which means no shift.)

The test fed input character vector into X in step 4 in Process 5 and then executed step 5 through step 15, but without generation of position in step 8 and with I=1 in step 10, to get the result (Correct in the case that the largest output belonged to the same class as input character vector (Y in step 15), or error in the case that the largest output belonged to other classes than the same class (N in step 15)).

Method 3. Receptive fields with Shift-invariant network

Test on weights after trained for T=20 iterations by Shift-invariant LVQ2' learning with receptive fields using weights initialized by method 1 through Process 1, 2, 3, 4 and 5.

The test fed input character vector into X in step 4 in Process 5 and then executed step 5 through step 15 to get the result (correct in the case that the largest output belonged to the same class as input character vector (Y in step 15), or error in the case that the largest output belonged to other classes than the same class (N in step 15)).

Method 1 yielded an accuracy of 98.34%, or 921 total correct readings out of 936 input characters. This was using a 32×32 field without receptive field Method 2 yielded a 99.68% accuracy, or a total of 933 characters recognized correctly out of 936. Method 2 utilized receptive fields, but did not use the shift-invariance method.

Method 3 used both the receptive fields and the shift-invariant network, and yielded 100% accuracy, or 936 characters recognized correctly out of 936 total.

The accuracy of the present invention at identifying among Hirakana and Katakana characters (see, e.g., FIG. 13) is shown in Table 3 below. In the LVQ2 method, a size of 16×16 was used for the input data (see FIG. 17). The size of the weight vector was 12×12, so there were 25 possible shift positions, as shown in FIG. 23. The results were as follows:

TABLE 3

| Recognition Accuracy for Hirakana and Katakana Characters | |
|---|---|
| Learning Method | Accuracy |
| LVQ2 | 95.8% |
| This invention | 98.0% |

The set of characters for the above test included 4,000 Kanji and Hirakana and Katakana characters.

What is claimed is:

1. A method for updating weights relating to previously learned information input into a neural network, the network having a database of learned information mapped onto an array, including the steps of:
   (1) mapping the input information onto the array;
   (2) isolating a predetermined subset of the array;
   (3) shifting the predetermined subset in at least one dimension;
   (4) comparing the predetermined subset in both unshifted and shifted positions with a corresponding subset of the learned information; and
   (5) based upon the comparison of step (4), determining an optimal shift for the input information; and
   (6) updating a weight relating to the learned information based upon the optimal shift.

2. The method of claim 1, wherein step 3 includes shifting the input information in two dimensions.

3. The method of claim 1, wherein step 3 includes rotating the input information.

4. The method of claim 1, wherein the array comprises a matrix of pixels having a first dimension and a second dimension, and wherein step 3 includes the steps of:
   (7) shifting the input information a predetermined first number of pixels in each of a negative direction and a positive direction in the first dimension without shifting in the second dimension;
   (8) shifting the input information a predetermined second number of pixels in each of a negative direction and a positive direction in the second dimension without shifting in the first dimension; and
   (9) shifting the input information the predetermined first number of pixels in each of the negative direction and the positive direction in the first dimension while shifting the input information the predetermined second number of pixels in each of the negative direction and the positive direction in the second dimension.

5. A method for learning information input in a neural network, where the input information corresponds to a feature stored in the neural network, including the steps of:
   (1) mapping the information onto at least one receptive field in an unshifted position;
   (2) shifting the mapped information into a plurality of shifted positions;
   (3) determining which of the plurality of shifted positions matches the stored feature most closely; and
   (4) based upon closest matching shifted position, updating a weight relating to the stored feature.

6. An apparatus for updating weights relating to information which has been learned in a neural network, the network including a database of leaned information mapped onto an array, comprising:
   means for mapping the input information onto the array;
   means coupled to the mapping means for isolating a plurality of predetermined subarrays of the mapped input information;
   means in communication with the isolating means for shifting the isolated subarrays of information in at least one dimension;
   means for storing the shifted subarrays;
   means in communication with the storing means for determining a closest match between each of the respective shifted subarrays and learned information corresponding thereto; and
   means in communication with the determining means for updating weights for the learned information based upon the determined closest matches.

7. The apparatus of claim 6, wherein the shifted, isolated subarrays include subarrays which are shifted in each of two dimensions.

8. The apparatus of claim 6, wherein the shifted, isolated subarrays include rotated subarrays which are shifted about an axis.

9. The apparatus of claim 6, wherein the array comprises a matrix of pixels having a first dimension and a second dimension, and wherein the shifted, isolated subarrays include:
   first shifted subarrays which are shifted a predetermined first number of pixels in each of a negative direction and a positive direction in the first dimension without shifting in the second dimension;
   second shifted subarrays which are shifted a predetermined second number of pixels in each of a negative direction and a positive direction in the second dimension without shifting in the first dimension; and
   third shifted subarrays which are shifted the predetermined first number of pixels in each of the negative direction and the positive direction in the first dimension, and are also shifted the predetermined second number of pixels in each of the negative direction and the positive direction in the second dimension.

10. An apparatus for learning input patterns in a neural network, wherein the patterns belong to classes of patterns, comprising:
    means for mapping at least one portion of each input pattern onto an input image area which is larger than the mapped portion;
    means in communication with the mapping means for shifting the portion of the pattern within the input image area to each one of a plurality of predetermined positions for comparison with prelearned portions of other patterns; and
    means in communication with the shifting means for generating weight vector outputs from the neural network based upon a best match between the shifted portion of the pattern at one of the predetermined positions and one of the prelearned portions of the other patterns.

11. The apparatus of claim 10, wherein the weight vector generating means includes means for changing a weight vector with the largest-valued output relating to a class other than a class to which the input pattern belongs farther away from input vector in the best-match position.

12. The apparatus of claim 10, wherein the weight vector generating means includes means for correlating unknown input patterns with prelearned patterns.

13. A method for learning distinguishing characteristics of patterns input into a neural network, including the steps of:
    (1) mapping an input pattern onto an array, the array comprising a predetermined number of tiles;
    (2) generating values for weights relating to each of the tiles;
    (3) repeating steps 1 and 2 for each of a plurality of patterns;
    (4) generating contributive values from the weight values based upon a correlation of the weight values for each of the tiles with weight values of corresponding tiles of other patterns;
(5) correlating the contributive values for determining which of the contributive values relate to regions of the array wherein patterns of the class differ most from one another;
(6) generating a set of sums of contributive values from sets of tiles;
(7) determining at least one subset of the set of sums which is higher than other sums;
(8) mapping the determined subset onto the array for generating at least one receptive field for comparison among different ones of said patterns, the receptive field relating to a region representing features of the patterns which are distinct from one another;
(9) defining an input image area which is larger than the generated receptive field;
(10) shifting data of each input pattern within the input image area for determining a best correspondence of the shifted data and a previously learned weight relating to the receptive field; and
(11) updating the weights based upon the shifted data.

* * * * *

UNITED STATES PATENT AND TRADEMARK OFFICE
CERTIFICATE OF CORRECTION

PATENT NO. : 5,263,107
DATED : November 16, 1993
INVENTOR(S) : Toru Ueda It is certified that error appears in the above-identified patent and that said Letters Patent is hereby corrected as shown below:

<u>IN THE DRAWINGS</u>

In Figure 19, the top expression in Step 18 currently reads:

"w (OmaxW) (t(k)) RNorm ( w(OmaxW) (t(k)))"

but should read:

--w (OmaxW) (t(k))=RNorm ( w(OmaxW) (t(k)))--.

In Figure 20, the bottom expression in Step 38 currently reads:

"w (OmaxW) (t(k)) RNorm ( w(OmaxW) (t(k)))"

but should read:

--w (OmaxW) (t(k))=RNorm ( w(OmaxW) (t(k)))--.

Signed and Sealed this

Nineteenth Day of April, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,263,107

DATED : November 16, 1993

INVENTOR(S) : Toru Ueda et al.

It is certified that error appears in the above-indentified patent and that said Letters Patent is hereby corrected as shown below:

Column 9, after line 62, insert the following:

```
                    W(OmaxW)=Norm( W(OmaxW) )      (21)
                    W(OmaxC)=Norm( W(OmaxC) )      (22)
            }
        }
    }
    If all input vectors are perfectly learned in Phase #1,
    go to Phase #2.
    If not, go to Phase #1 again.

[Phase #2]
    {
        For m=1,M      ;Number m of input vectors
        {
            X=Xm       Input vector X substitutes Xm of
                       input vector m which is assumed to
                       belong to class n             (15)
            For j=1,J ;Number j of weight vectors
            {
            Oj=O(X,Wj)                               (16)
            }
            OmaxC=max( Oj }                          (17)
                 j within class n
            OmaxW=max( Oj }                          (18)
                 j out of class n If a ratio of OmaxW to OmaxC > RATIO,
            {
                W(OmaxC)=W(OmaxC)+ A(t)*(X - W(OmaxC)); to
                make W(OmaxC) closer to X            (20)
                W(OmaxW)=W(OmaxW)- A(t)*(X - W(OmaxW)); to
                make W(OmaxW) far away from X        (19)

W(OmaxC)=Norm( W(OmaxC) )            (22)
                W(OmaxW)=Norm( W(OmaxW) )            (21)
            }
```

UNITED STATES PATENT AND TRADEMARK OFFICE
CERTIFICATE OF CORRECTION

PATENT NO. : 5,263,107
DATED : November 16, 1993
INVENTOR(S) : Toru Ueda et al.

It is certified that error appears in the above-indentified patent and that said Letters Patent is hereby corrected as shown below:

Column 19, line 60, " max2() " should read -- max2() --;

Column 22, line 44, " $O_{ij}$ " should read -- $o_{ij}$ --.

Signed and Sealed this

Seventh Day of June, 1994

Attest:

BRUCE LEHMAN

Attesting Officer      Commissioner of Patents and Trademarks